(12) United States Patent
Park et al.

(10) Patent No.: US 11,063,463 B2
(45) Date of Patent: Jul. 13, 2021

(54) WEARABLE DEVICE

(71) Applicant: Samsung Electronics Co., Ltd., Suwon-si (KR)

(72) Inventors: Sung-Bum Park, Suwon-si (KR); Dong-Zo Kim, Yongin-si (KR); Jae-Hyun Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 171 days.

(21) Appl. No.: 14/996,095

(22) Filed: Jan. 14, 2016

(65) Prior Publication Data

US 2016/0204646 A1 Jul. 14, 2016

(30) Foreign Application Priority Data

Jan. 14, 2015 (KR) .................. 10-2015-0006852

(51) Int. Cl.
| | |
|---|---|
| *H02J 50/12* | (2016.01) |
| *H02J 7/02* | (2016.01) |
| *H04B 5/00* | (2006.01) |
| *H01F 38/14* | (2006.01) |
| *H02J 7/00* | (2006.01) |
| *H02J 50/50* | (2016.01) |

(52) U.S. Cl.
CPC .............. *H02J 7/025* (2013.01); *H02J 50/12* (2016.02); *H04B 5/0037* (2013.01); *H01F 38/14* (2013.01); *H02J 7/0042* (2013.01); *H02J 50/502* (2020.01)

(58) Field of Classification Search
CPC .......... H02J 50/12; H02J 50/502; H02J 7/025; H02J 7/0042; H02J 50/00; H02J 5/005; H04B 5/0037; H01F 38/14
See application file for complete search history.

(56) References Cited

U.S. PATENT DOCUMENTS

| | | | |
|---|---|---|---|
| 4,873,677 A | 10/1989 | Kenji et al. | |
| 5,191,685 A * | 3/1993 | Aoki .................... | A44C 5/2052 24/265 WS |

(Continued)

FOREIGN PATENT DOCUMENTS

| | | |
|---|---|---|
| CN | 103051069 A | 4/2013 |
| CN | 103248094 A | 8/2013 |

(Continued)

OTHER PUBLICATIONS

Communication dated Jan. 31, 2018 with Extended European Search Report corresponding to European Patent Application No. 16737549.2.

(Continued)

*Primary Examiner* — Daniel Cavallari
(74) *Attorney, Agent, or Firm* — Sughrue Mion, PLLC

(57) ABSTRACT

Disclosed are various embodiments relating to a wearable device. According to an embodiment, a wearable device including a wireless charging device may include: a housing of the wearable device; first and second straps connected to the housing; first and second buckles provided on the first and second straps; a reception resonator provided in the housing to receive power transmitted from the outside; and a wireless power reception module provided in the housing and electrically connected to the reception resonator. Various other embodiments can be made.

13 Claims, 18 Drawing Sheets

(56) References Cited

U.S. PATENT DOCUMENTS

| | | | | |
|---|---|---|---|---|
| 6,073,316 | A * | 6/2000 | Ferrario | A44C 5/24 24/71 J |
| 6,265,789 | B1 | 7/2001 | Honda et al. | |
| 7,385,498 | B2 | 6/2008 | Dobosz | |
| 2010/0308725 | A1 * | 12/2010 | Trzecieski | H01M 2/1022 315/32 |
| 2013/0093255 | A1 | 4/2013 | Jung et al. | |
| 2013/0187598 | A1 | 7/2013 | Park et al. | |
| 2013/0214611 | A1 | 8/2013 | Bae | |
| 2013/0257367 | A1 | 10/2013 | Someya | |
| 2013/0310630 | A1 * | 11/2013 | Smith | A61M 1/1086 600/16 |
| 2014/0083133 | A1 * | 3/2014 | Lee | A44C 5/14 63/3.1 |
| 2014/0139180 | A1 | 5/2014 | Kim et al. | |
| 2014/0187157 | A1 * | 7/2014 | Liao | H04B 5/0081 455/41.1 |
| 2014/0375246 | A1 | 12/2014 | Boysen et al. | |
| 2015/0263528 | A1 * | 9/2015 | Kitamura | H01F 27/2804 307/104 |
| 2015/0348697 | A1 * | 12/2015 | Graham | H02J 50/12 336/189 |

FOREIGN PATENT DOCUMENTS

| | | |
|---|---|---|
| CN | 203422610 U | 2/2014 |
| JP | 2001231174 | 8/2001 |
| JP | 2011160501 | 8/2011 |
| KR | 20070044614 | 4/2007 |
| KR | 10-1196994 | 11/2012 |
| KR | 2013-0123082 | 11/2013 |
| KR | 2014-0064325 | 5/2014 |
| KR | 20140067443 | 5/2014 |
| WO | 2014-039567 A1 | 3/2014 |
| WO | 2014/205383 A1 | 12/2014 |

OTHER PUBLICATIONS

International Search Report dated Apr. 18, 2016 corresponding to International Patent Application No. PCT/KR2016/000351.
Written Opinion of the International Searching Authority dated Apr. 18, 2016 corresponding to PCT/KR2016/000351.
Communication dated May 29, 2019 issued by the State Intellectual Property Office of P.R. China in counterpart Chinese Application No. 201680005855.0.
Communication dated Apr. 20, 2020 issued by the State Intellectual Property Office of P.R. China in counterpart Chinese Application No. 201680005855.0.

* cited by examiner

WEARABLE DEVICE

RELATED APPLICATION(S)

This application claims the priority under 35 U.S.C. § 119(a) to Korean Application Serial No. 10-2015-0006852, which was filed in the Korean Intellectual Property Office on Jan. 14, 2015, the entire content of which is hereby incorporated by reference.

BACKGROUND

Various embodiments of the present disclosure relate to a wearable device including a wireless charging device that wirelessly receives power and performs charging.

In general, a mobile terminal, such as a portable electronic device, has a rechargeable battery pack due to a characteristic thereof, and in order to recharge the battery pack, electrical energy is supplied to the battery pack of the mobile terminal using a separate charging device.

The charging device and the battery pack have separate contact terminals on the exterior thereof, respectively, and are electrically connected through contact between the contact terminals. However, such a contact type of charging method has a problem in that contact terminals are exposed to the outside so that the contact terminals are likely to be contaminated by foreign substances, and for this reason, the battery pack is not properly charged. Furthermore, the battery charging is also not properly performed in cases where the contact terminals are exposed to moisture.

In order to solve the problem, wireless charging or contactless charging technologies have been recently developed and used in a number of portable electronic devices. In the wireless charging technologies that use wireless power transmission and reception, a battery pack can be automatically charged only by placing a portable electronic device on a charging pad of a wireless charging device, which is separately provided outside the portable electronic device, without connecting the portable electronic device to a separate charging connector.

Examples of the wireless charging technologies include an electromagnetic induction scheme using a coil, a resonance scheme using a resonance, and an RF/microwave radiation scheme converting electrical energy to microwaves and then transmitting the microwaves.

In particular, the resonance scheme uses resonance, namely, a physical concept that when a tuning fork oscillates, a wine glass next to the tuning fork also oscillates at the same frequency. In the resonance scheme, electromagnetic waves containing electrical energy resonate instead of sound. It is known that resonant electrical energy does not affect surrounding machines and human bodies in contrast to other electromagnetic waves because the resonant electrical energy is directly transferred only to a device having a resonance frequency, and its unused portion is reabsorbed into an electromagnetic field instead of spreading into the air.

The wireless charging device using a resonator is constituted with a transmission resonator, a reception resonator, and a wireless power transmission device.

The wireless charging device may be included in a portable communication device and a smart phone, and may also be employed for a wearable device that has recently emerged as a device to complement or substitute for a smart phone.

SUMMARY

However, in the case of a wearable device that includes a wireless charging device using a resonator, a reception resonator that can receive power has to be inserted into a narrow space within the device. For example, the reception resonator has to be attached to the rear surface of the wearable device so that a transmission distance is very short. Accordingly, a user of the wearable device has to locate the device at a specific location close to an external transmission resonator that transmits power.

For example, the reception resonator which receives the power transmitted from the transmission resonator may be mounted in the main body of the wearable device. In this case, the size of the reception resonator may be very small due to a limitation of space of the wearable device. As the reception resonator becomes smaller, a coefficient of combination with the transmission resonator also becomes smaller, and due to this, transmission efficiency decreases in cases where the transmission distance between the reception resonator and the transmission resonator increases.

In addition, since the wearable device is charged while being seated on the upper surface of a large and wide external charging pad, charging efficiency may be rapidly degraded, and the wearable device may not be charged on the charging pad when the wearable device is spaced away from or misaligned with the charging pad.

Consequently, a device that has various arrangements of a wireless charging device in a wearable device to facilitate wireless charging of the wearable device and enables power transmission from a longer distance in view of enhancement of user convenience and power transmission efficiency may be useful.

Accordingly, various embodiments of the present disclosure provide a wearable device including a wireless charging device in which a reception resonator and a wireless power reception module can be diversely mounted in the wearable device.

Furthermore, various embodiments of the present disclosure provide a wearable device including a wireless charging device in which locations where a reception resonator and a wireless power reception module are mounted in the wearable device can be diversely changed.

In addition, various embodiments of the present disclosure provide a wearable device including a wireless charging device in which a reception resonator is mounted in a housing of the wearable device, and a dummy resonator is additionally mounted in a strap, which makes it possible to transmit power in 3D wireless transmission (long range) as well as 2D wireless transmission (short range), thereby enhancing power transmission efficiency of a receiver.

Here, the 2D wireless transmission (short range) may mean that wireless transmission is performed while a wearable device is seated on a charging pad, and the 3D wireless transmission (long range) may mean that wireless transmission is performed while a wearable device is spaced far away from a charging pad.

For example, a 2D wireless transmission distance may be 1 cm or less, and a 3D wireless transmission distance may be 10 cm or more.

According to various embodiments of the present disclosure, a wearable device including a wireless charging device may include: a housing of the wearable device; first and second straps connected to the housing; first and second buckles provided on the first and second straps; a reception resonator provided in the housing to receive power transmitted from the outside; and a wireless power reception module provided in the housing and electrically connected to the reception resonator.

According to various embodiments of the present disclosure, a wearable device including a wireless charging device may include: a housing of the wearable device; a strap connected to the housing; a reception resonator provided in the housing to receive power transmitted from the outside; and a wireless power reception module provided in the housing and electrically connected to the reception resonator.

According to various embodiments of the present disclosure, a wearable device including a wireless charging device may include: a housing of the wearable device; a strap connected to the housing; a dummy resonator provided in the housing and the strap to receive power transmitted from the outside; a reception resonator that is isolated from the dummy resonator in the housing and receives the power from the dummy resonator; and a wireless power reception module provided in the housing and electrically connected to the reception resonator.

According to various embodiments of the present disclosure, a wearable device including a wireless charging device may include: a housing of the wearable device; first and second straps connected to the housing; first to third dummy resonators provided in the housing and the first and second straps to receive power transmitted from the outside; a reception resonator that is provided in the housing and isolated from the first to third dummy resonators and receives the power from the first to third dummy resonators; and a wireless power reception module provided in the housing and electrically connected to the reception resonator.

According to the various embodiments of the present disclosure, locations where a reception resonator and a wireless power reception module are mounted in a wearable device can be diversely changed, thereby facilitating mounting and installation of a wireless charging device, enhancing wireless charging of the wearable device, achieving an appealing design of the wearable device, and easily manufacturing the wearable device.

Also, mounting locations of a reception resonator and a wireless power reception module can be diversely changed in view of interworking with an external electronic device.

Further, a reception resonator is mounted in a housing of a wearable device, and a dummy resonator that transmits power to the reception resonator is additionally mounted in a strap, which makes it possible to transmit power in 3D wireless transmission (long range) as well as 2D wireless transmission (short range), thereby enhancing power transmission efficiency of a receiver.

Here, the 2D wireless transmission (transmission distance of 1 cm or less) may mean that wireless transmission is performed while a wearable device is seated on a charging pad, and the 3D wireless transmission (transmission distance of 10 cm or more) may mean that wireless transmission is performed while a wearable device is spaced far away from a charging pad.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
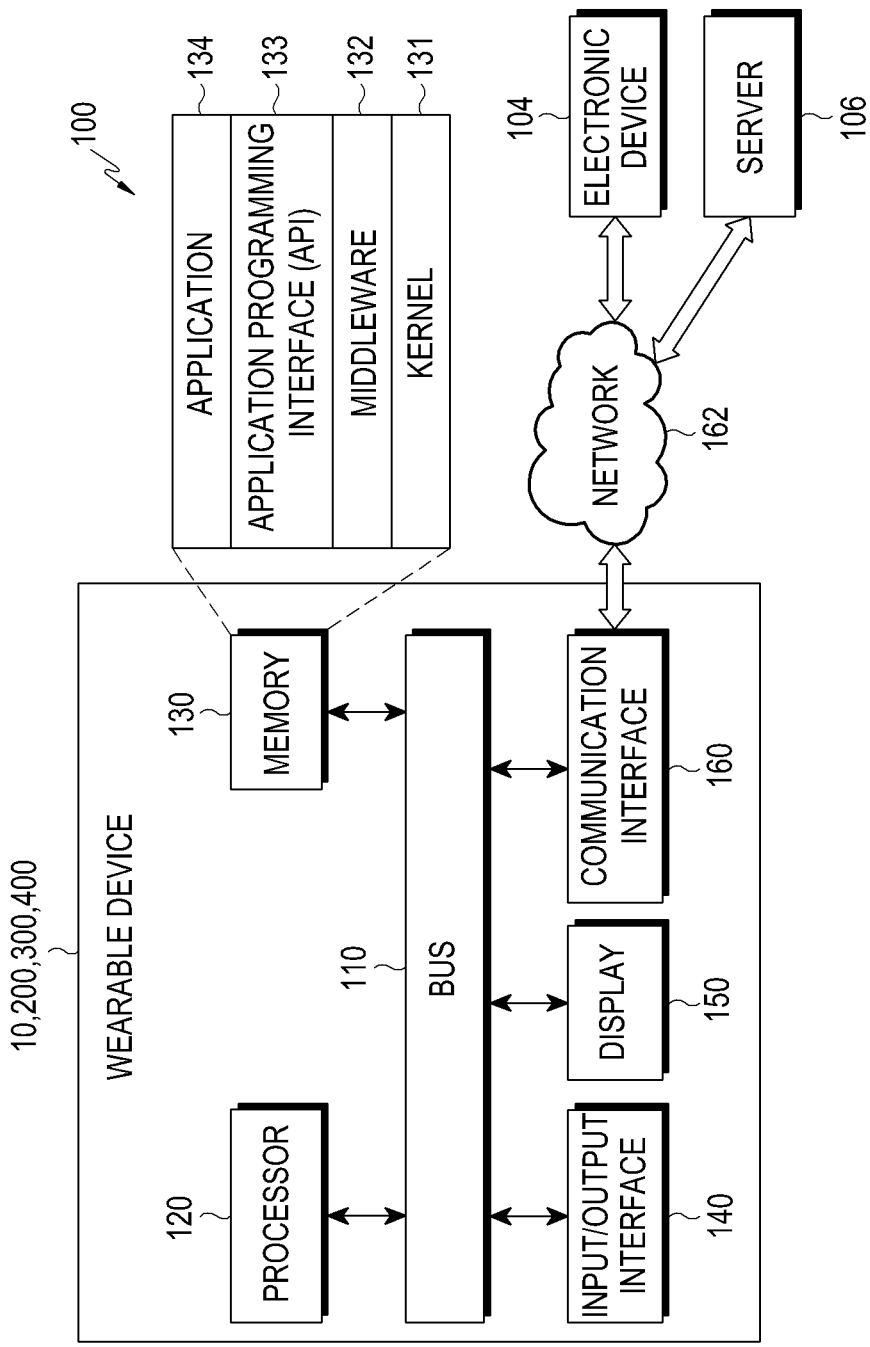
FIG. 1 is a block diagram illustrating a network environment that includes wearable devices according to various embodiments of the present disclosure.

Hereinafter, terms used in various embodiments of the present disclosure will be briefly described, and the various embodiments of the present disclosure will be described in detail.

With respect to the terms in the various embodiments of the present disclosure, the general terms which are currently and widely used are selected in consideration of functions of structural elements in the various embodiments of the present disclosure. However, meanings of the terms may be changed according to an inventor's intention, a judicial precedent, appearance of a new technology, and the like. Further, in a certain case, a term arbitrarily selected by the applicant may be used. In such a case, the meaning of the term will be described in detail at the corresponding part in the description of the present disclosure. Thus, the terms used in various embodiments of the present disclosure should be defined based on the meanings of the terms and the overall contents of the embodiments of the present disclosure instead of simple titles of the terms.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure.

Herein, an electronic device charged by using a wireless charging device, according to the various embodiments of the present disclosure, will be described. First, the electronic device according to embodiments of the present disclosure may be applied to not only all types of mobile communication terminals that are operated based on communication protocols corresponding to various communication systems, but also all types of information and communication devices, multimedia devices, and application devices thereof, including a video phone, an electronic book (e-book) reader, a laptop personal computer (PC), a netbook computer, a personal digital assistant (PDA), a portable multimedia player (PMP), an MP3 (MPEG-1 audio layer-3) player, a mobile medical appliance, a camera, or a wearable device (e.g., a head-mounted-device (HMD) such as electronic glasses, electronic clothes, an electronic bracelet, an electronic necklace, an electronic appcessory, electronic tattoos, or a smart watch).

According to some embodiments, the electronic device may be a smart home appliance. For example, the smart home appliance may include at least one of a television, a digital video disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to some embodiments, the electronic device may include at least one of various medical devices {e.g., a magnetic resonance angiography (MRA), a magnetic resonance imaging (MRI), a computed tomography (CT) machine, and an ultrasonic machine}, navigation devices, global positioning system (GPS) receivers, event data recorders (EDR), flight data recorders (FDR), vehicle infotainment devices, electronic devices for ships (e.g., navigation devices for ships, and gyro-compasses), avionics, security devices, automotive head units, robots for home or industry, automatic teller's machines (ATMs) in banks, or point of sales (POS) in shops.

According to some embodiments, the electronic device may include at least one of furniture or a part of a building/structure, an electronic board, an electronic signature receiving device, a projector, and various types of measuring devices (e.g., a water meter, an electric meter, a gas meter, a radio wave meter and the like) including a camera function.

An electronic device according to various embodiments of the present disclosure may be a combination of one or more of above described various devices. Also, an electronic device according to various embodiments of the present disclosure may be a flexible device. Also, an electronic device according to various embodiments of the present disclosure is not limited to the above described devices.

An electronic device according to various embodiments of the present disclosure may include a device that can be worn on the body, and such a device may be exemplified by a wearable device such as a smart watch or a biometric signal measurement device. Further, the wearable device may communicate with an external electronic device such as a server, or may be linked to the external electronic device so as to perform an operation. For example, an image captured by a camera of the wearable electronic device and/or location information detected by a sensor unit may be transmitted to the server through a network, and the transmitted data may be stored in and displayed to the linked electronic device. The network may be a mobile or cellular communication network, a Local Area Network (LAN), a Wireless Local Area Network (WLAN), a Wide Area Network (WAN), an Internet, a Small Area Network (SAN) or the like, but is not limited thereto.

The electronic device interworking with the wearable electronic device may include a smartphone, a mobile phone, a navigation device, a gaming device, a TV, a vehicular head unit, a notebook computer, a laptop computer, a tablet computer, a Personal Media Player (PMP), and a Personal Digital Assistants (PDA), and may be another wearable electronic device. The wearable device may be implemented as a pocket-sized portable communication terminal or electronic device having a wireless communication function.

A detailed operation of a wearable device according to various embodiment of the present disclosure will be described.

First, FIG. 1 illustrates a network environment 100 that includes the wearable device 10, the wearable device 200, the wearable device 300, and the wearable device 400 and another electronic device 104, according to various embodiments.

Referring to FIG. 1, each of the wearable device 10, the wearable device 200, the wearable device 300, and the wearable device 400 may include a bus 110, a processor 120, a memory 130, an input/output interface 140, a display unit 150, and a communication interface 160. The bus 110 may be a circuit that interconnects elements of the wearable device 10, the wearable device 200, the wearable device 300, and the wearable device 400, and transfers communication (e.g., a control message) between the elements.

The processor 120 may, for example, receive instructions from the other elements (e.g., the memory 130, the input/output interface 140, the display unit 150, the communication interface 160, etc.) through the bus 110, decode the received instructions, and carry out operations or data processing according to the decoded instructions.

The memory 130 may store instructions or data received from, or generated by the processor 120 or the other elements (e.g., the input/output interface 140, the display unit 150, the communication interface 160, etc.). The memory 130 may include programming modules, for example, such as a kernel 131, middleware 132, an Application Programming Interface (API)—API 133, applications 134, and the like. Each of the programming modules may be configured with software, firmware, hardware, or a combination of two or more thereof.

The kernel 131 may control or manage system resources (e.g., the bus 110, the processor 120, the memory 130, etc.) that are used to execute operations or functions implemented in the other programming modules, for example, the middleware 132, the API 133, and the applications 134. Furthermore, the kernel 131 may provide an interface by which the middleware 132, the API 133, or the applications 134 access individual elements of the wearable devices 10, the wearable device 200, the wearable device 300, and the wearable device 400 to control or manage the elements.

The middleware 132 may function as an intermediary such that the API 133 or the applications 134 communicate with the kernel 131 to exchange data. Furthermore, in regard to task requests received from the applications 134, the middleware 132 may, for example, perform a control (e.g., scheduling or load balancing) for the task requests using a method of assigning a priority to use system resources (e.g., the bus 110, the processor 120, the wearable devices 10, 200, 300, and 400 to at least one of the applications 134.

The API 133 is an interface used, by the applications 134, to control a function provided from the kernel 131 or the middleware 132, and may include, for example, at least one interface or function (e.g., instruction) for file control, window control, image processing, text control, etc.

According to various embodiments, the applications 134 may include a Short Message Service (SMS)/Multimedia Message Service (MMS) application, an e-mail application, a calendar application, an alarm application, a health care application (e.g., an application for measuring a work rate or blood sugar), an environment information application (e.g., an application for providing atmospheric pressure, humidity, or temperature information), etc. Additionally or alternatively, the applications 134 may include an application relating to information exchange between the wearable devices 10, 200 and an external electronic device (e.g., the electronic device 104). The application associated with the information exchange may include, for example, a notification relay application for forwarding specific information to the external electronic device, or a device management application for managing the external electronic device.

For example, the notification relay application may include a function of forwarding, to the external electronic device (e.g., the electronic device 104), notification information generated from other applications (e.g., the SMS/MMS application, the e-mail application, the health care application, the environmental information application, etc.) of the wearable devices 10, 200, 300, and 400. Additionally or alternatively, the notification relay application may, for example, receive notification information from the external electronic device (e.g., the electronic device 104) and provide the received notification information to a user. The device management application may, for example, manage (e.g., install, delete, or update) a function for at least a part of the external electronic device (e.g., the electronic device 104) communicating with the wearable devices 10 and 200 (e.g., activating/deactivating the external electronic device itself (or some elements thereof) or adjusting the brightness (or resolution) of a display), an application operating in the external electronic device, or a service (e.g., a telephone call service or a message service) provided from the external electronic device.

According to various embodiments, the applications 134 may include an application specified according to the property (e.g., type) of the external electronic device (e.g., the electronic device 104). For example, in cases where the external electronic device is an MP3 player, the applications 134 may include an application relating to the reproduction of music. Similarly, in cases where the external electronic device is a mobile medical device, the applications 134 may include an application relating to health care. According to an embodiment, the applications 134 may include at least one of an application specified for the wearable devices 10, 200 and an application received from the external electronic device (e.g., a server 106 or the electronic device 104).

The input/output interface 140 may forward instructions or data input by a user through an input/output device (e.g., a sensor, a keyboard, or a touch screen), for example, to the processor 120, the memory 130, and the communication interface 160 through the bus 110. For example, the input/output interface 140 may provide, to the processor 120, data on a user's touch input through a touch screen. The input/output interface 140 may, for example, output instructions or data received through the bus 110 from the processor 120, the memory 130, and the communication interface 160, through an input/output device (e.g., a speaker or a display). The input/output interface 140 may include an audio module.

The display unit 150 may display various types of information (e.g., multimedia data, text data, etc.) to a user.

The communication interface 160 may establish a communication connection between the wearable devices 10, 200 and an external device (e.g., the electronic device 104 or the server 106). For example, the communication interface 160 may be connected to a network 162 through wireless or wired communication to communicate with the external device. The wireless communication may include, for example, at least one of Wi-Fi, Bluetooth (BT), Near Field Communication (NFC), a Global Positioning System (GPS), and cellular communication (e.g., long term evolution (LTE), long term evolution-advanced (LTE-A), code division multiple access (CDMA), wideband code division multiple access (WCDMA), Universal Mobile Telecommunications Service (UMTS), wireless broadband (WiBro), Global System for Mobile communication (GSM), etc,). The wired communication may include, for example, at least one of a Universal Serial Bus (USB), a High Definition Multimedia Interface (HDMI), Recommended-Standard 232 (RS-232), and a Plain Old Telephone Service (POTS).

According to an embodiment, the network 162 may be a telecommunication network. The telecommunication network may include at least one of a computer network, the Internet, Internet of Things, and a telephone network. According to an embodiment, a protocol (e.g., a transport layer protocol, a data link layer protocol, or a physical layer protocol) for communication between the wearable devices 10, 200, 300, and 400 and an external device may be supported by at least one of the applications 134, the API 133, the middleware 132, the kernel 131, and the communication interface 160.

According to various embodiments, a controller may include the processor 120 and the memory 130 for storing information applicable by the processor 120. The controller, a central processing unit, may control overall operations of the wearable devices 10, 200, 300, and 400.

Furthermore, a device that wirelessly receives power and charges a wearable device is described as an example of the wearable device including a wireless charging device according to various embodiments, but the present disclosure is not limited thereto. That is, any electronic device that includes a wireless charging device that wirelessly receives power and performs charging may be diversely employed as the wearable device.

Figure 2:
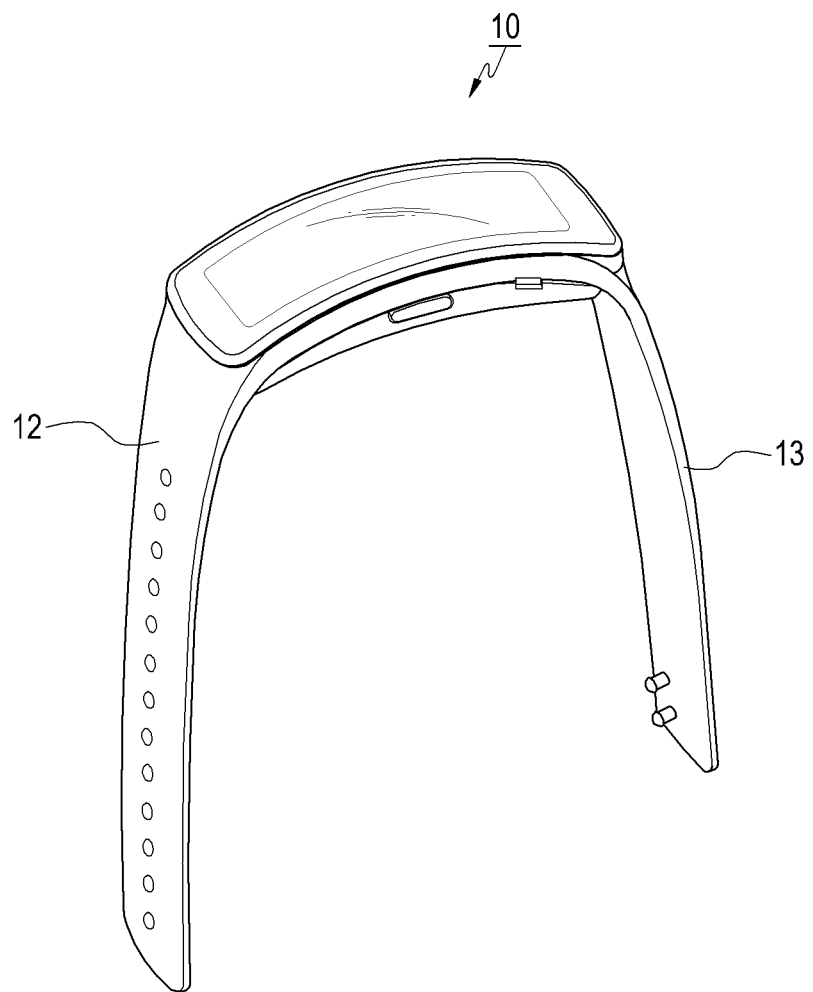
FIG. 2 is a perspective view illustrating a wearable device including a wireless charging device according to an embodiment of the present disclosure.
Figure 3:
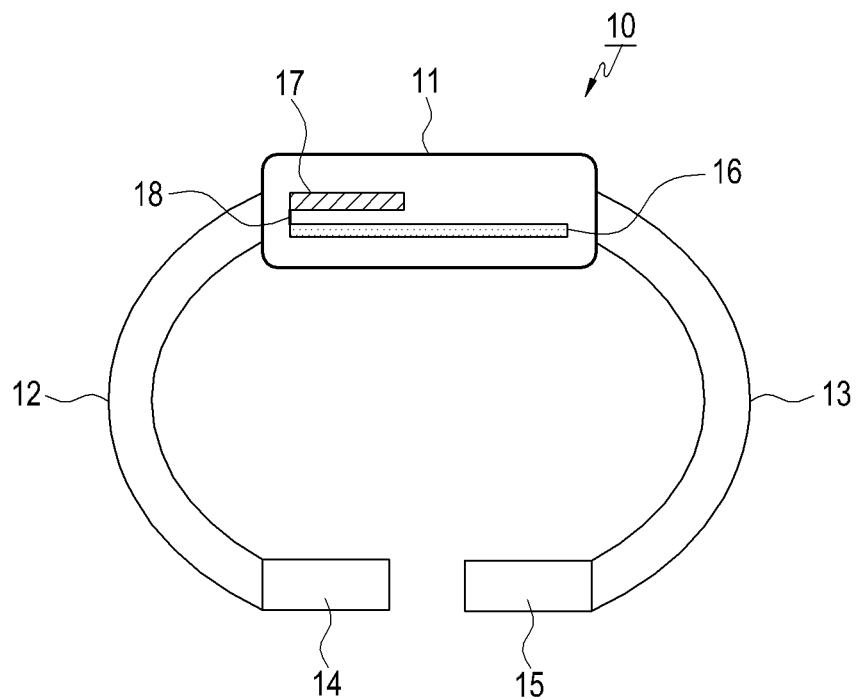
FIG. 3 is a side sectional view illustrating a configuration of the wearable device including the wireless charging device according to the embodiment of the present disclosure.

FIG. 2 is a perspective view illustrating a wearable device 10 including a wireless charging device according to an embodiment ('a first embodiment') of the present disclosure, and FIG. 3 is a side sectional view illustrating a configuration of the wearable device 10 including the wireless charging device according to the embodiment ('the first embodiment') of the present disclosure.

Referring to FIGS. 2 and 3, the wearable device 10 including the wireless charging device includes a housing 11 of the wearable device 10, a first strap 12, a second strap 13, a first buckle 14, a second buckle 15, a reception resonator 16, and a wireless power reception module 17.

The wireless charging device may be constituted with the reception resonator 16 and the wireless power reception module 17.

The housing 11 is configured such that the reception resonator 16 and the wireless power reception module 17, which will be described below, are mounted therein.

The first strap 12 and the second strap 13 may be connected to opposite sides of the housing 11 to surround a user's body and wrist.

The first buckle 14 and the second buckle 15 are provided at tip ends of the first strap 12 and the second strap 13, respectively, to fasten and fix the first strap 12 and the second strap 13.

The reception resonator 16 is provided in the housing 11 to receive power transmitted from an external wireless charging device (not illustrated).

The wireless power reception module 17 is provided in the housing 11 and is electrically connected to the reception resonator 16.

For example, the wireless power reception module 17 rectifies AC power induced via the reception resonator 16 to DC power through a rectifier 351 (illustrated in FIG. 22) to output the DC power, and supplies the output DC power to a battery pack R1 (illustrated in FIG. 22) included in the wearable device 10 to charge the battery pack.

The rectifier 351 converts AC power to DC power and outputs the DC power, and the wireless power reception module supplies the output DC power to the battery pack R1 (illustrated in FIG. 22) and charges the battery pack.

More specifically, the external wireless charging device (not illustrated) includes a power amplifier, and the power amplifier generates AC power concentrated on a resonant frequency by using DC power of a power supply and an external high-frequency AC power supply. Further, the power amplifier transmits a high-frequency AC waveform to a transmission resonator (not illustrated) to induce a magnetic field.

The reception resonator 16 may receive the AC power induced in the transmission resonator and apply the received AC power to the wireless power reception module 17, and the wireless power reception module 17 may rectify the AC power through the rectifier 351 (illustrated in FIG. 22) to output DC power and may supply the output DC power to the battery pack (not illustrated) of the wearable device 10 to wireless charge the battery pack.

The wearable device 10 may be constituted with one of a Head-Mounted Device (HMD) such as electronic glasses, electronic clothing, an electronic bracelet, an electronic necklace, an electronic appcessory, an electronic tattoo, and a smart watch.

As described above, the wearable device 10 is configured such that the reception resonator 16 and the wireless power reception module 17 can be mounted together in the housing 11 thereof, thereby facilitating and simplifying the mounting of the reception resonator 16 and the wireless power reception module 17. In addition, by mounting both the reception resonator 16 and the wireless power reception module 17 in the housing 11, it is possible to freely implement design shapes of the first strap 12, the second strap 13, the first buckle 14, and the second buckle 15, and to achieve an appealing design of the wearable device 10.

Figure 4:
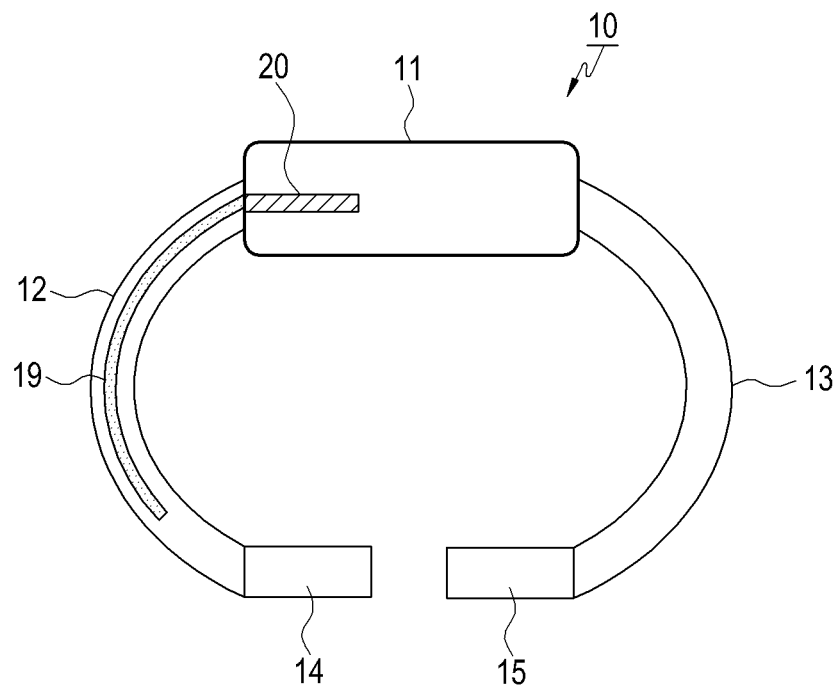
FIG. 4 is a side sectional view illustrating a configuration of a wearable device including a wireless charging device according to another embodiment of the present disclosure.

FIG. 4 illustrates a wearable device 10 including a wireless charging device according to another embodiment ('a second embodiment') of the present disclosure.

FIG. 4 is a side sectional view illustrating a configuration of the wearable device including the wireless charging device according to the second embodiment of the present disclosure.

As illustrated in FIG. 4, the wearable device 10 includes a housing 11 of the wearable device 10, a first strap 12, a second strap 13, a first buckle 14, a second buckle 15, a reception resonator 19, and a wireless power reception module 20.

The wireless charging device may be constituted with the reception resonator 19 and the wireless power reception module 20.

The reception resonator 19 may be mounted in the first strap 12 to receive power transmitted from an external transmission resonator (not illustrated).

The reception resonator 19 may be mounted along the shape of the first strap.

The wireless power reception module 20 may be mounted in the housing 11 to be electrically connected to the reception resonator 19.

That is, the wireless power reception module 20 rectifies AC power induced via the reception resonator 19 mounted in the first strap to DC power through the rectifier 351 (illustrated in FIG. 22) to output the DC power, and supplies the output DC power to the battery pack R1 (illustrated in FIG. 22) included in the wearable device 10 to charge the battery pack.

As described above, the wireless power reception module 20 can be independently mounted in the housing 11 of the wearable device 10, thereby making the housing 11 slim, and the reception resonator 19 can be mounted along the shape of the first strap, thereby diversely designing the shape of the first strap 12 and the second strap 13.

Figure 5:
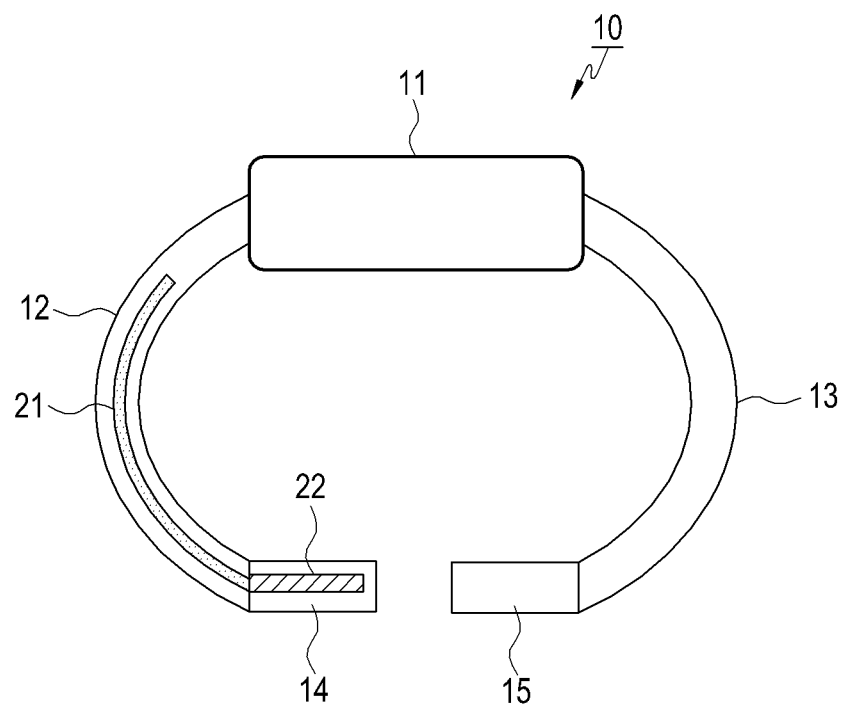
FIG. 5 is a side sectional view illustrating a configuration of a wearable device including a wireless charging device according to yet another embodiment of the present disclosure.

FIG. 5 illustrates a wearable device 10 including a wireless charging device according to yet another embodiment ('a third embodiment') of the present disclosure.

FIG. 5 is a side sectional view illustrating a configuration of the wearable device 10 including the wireless charging device according to the third embodiment of the present disclosure.

As illustrated in FIG. 5, the wearable device 10 includes a housing 11 of the wearable device 10, a first strap 12, a second strap 13, a first buckle 14, a second buckle 15, a reception resonator 21, and a wireless power reception module 22.

The wireless charging device may be constituted with the reception resonator 21 and the wireless power reception module 22.

The reception resonator 21 may be mounted in the first strap 12 to receive power transmitted from an external transmission resonator (not illustrated).

The reception resonator 21 may be mounted along the shape of the first strap.

The wireless power reception module 22 may be mounted in the first buckle 14 to be electrically connected to the reception resonator 21.

That is, the wireless power reception module 22 rectifies AC power induced via the reception resonator 21 mounted in the first strap to DC power through the rectifier 351 (illustrated in FIG. 22) to output the DC power, and supplies the output DC power to the battery pack R1 (illustrated in FIG. 22) included in the wearable device 10 to charge the battery pack.

As described above, the wireless power reception module 22 can be independently mounted in the first buckle 14, thereby making the housing 11 slim and small, and the reception resonator 21 can be mounted along the shape of the first strap, thereby diversely designing the shape of the first strap 12 and the second strap 13.

Figure 6:
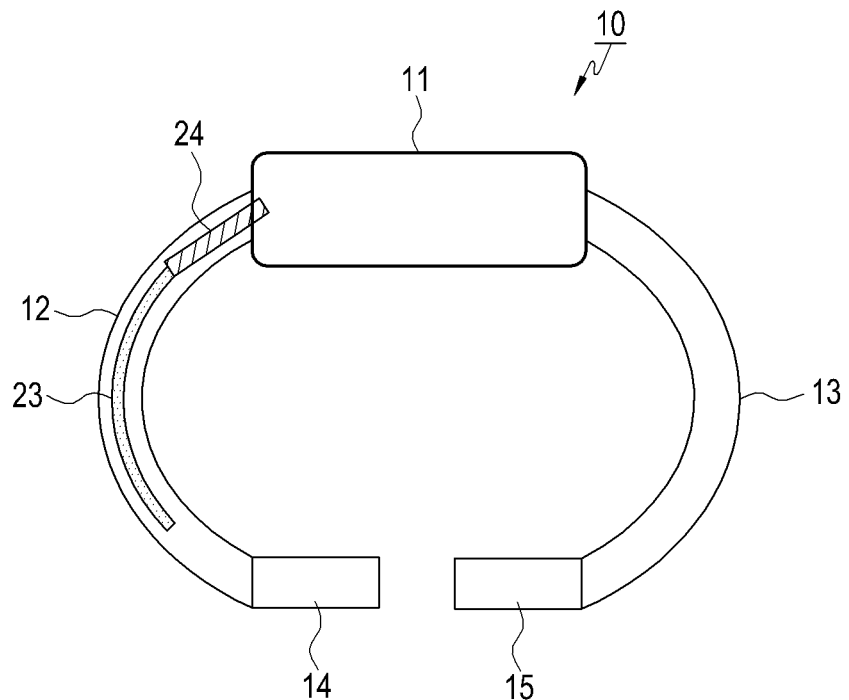
FIG. 6 is a side sectional view illustrating a configuration of a wearable device including a wireless charging device according to yet another embodiment of the present disclosure.

FIG. 6 illustrates a wearable device 10 including a wireless charging device according to yet another embodiment ('a fourth embodiment') of the present disclosure.

FIG. 6 is a side sectional view illustrating a configuration of the wearable device 10 including the wireless charging device according to the fourth embodiment of the present disclosure.

As illustrated in FIG. 6, the wearable device 10 includes a housing 11 of the wearable device 10, a first strap 12, a second strap 13, a first buckle 14, a second buckle 15, a reception resonator 23, and a wireless power reception module 24.

The wireless charging device may be constituted with the reception resonator 23 and the wireless power reception module 24.

The reception resonator 23 may be mounted in the first strap 12 to receive power transmitted from an external transmission resonator (not illustrated).

The reception resonator 23 may be mounted along the shape of the first strap.

The wireless power reception module 24 may be mounted in the first strap 12 to be electrically connected to the reception resonator 23.

That is, both the reception resonator 23 and the wireless power reception module 24 may be mounted together in the first strap 12.

The wireless power reception module 24 rectifies AC power induced via the reception resonator 23 mounted in the first strap to DC power through the rectifier 351 (illustrated in FIG. 22) to output the DC power, and supplies the output DC power to the battery pack R1 (illustrated in FIG. 22) included in the wearable device 10 to charge the battery pack.

As described above, the reception resonator 23 and the wireless power reception module 24 can be mounted together in the first strap 12, thereby making the housing 11 slimmer and smaller, and diversely designing the shapes of the housing 11 and the first strap 12 and the second strap 13.

Figure 7:
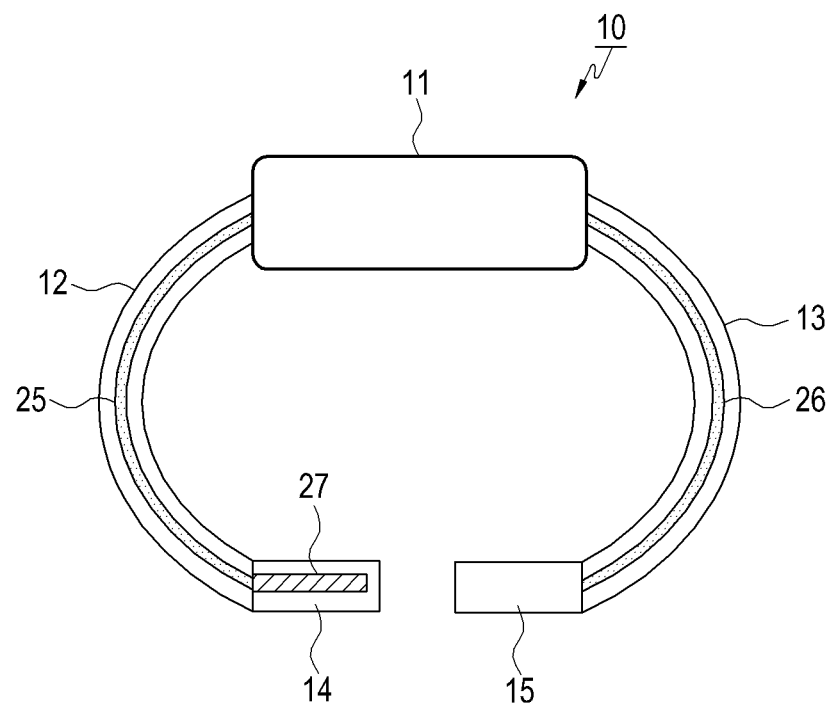
FIG. 7 is a side sectional view illustrating a configuration of a wearable device including a wireless charging device according to yet another embodiment of the present disclosure.

FIG. 7 illustrates a wearable device 10 including a wireless charging device according to yet another embodiment ('a fifth embodiment') of the present disclosure.

FIG. 7 is a side sectional view illustrating a configuration of the wearable device 10 including the wireless charging device according to the fifth embodiment of the present disclosure.

As illustrated in FIG. 7, the wearable device 10 includes a housing 11 of the wearable device 10, a first strap 12, a second strap 13, a first buckle 14 and a second buckle 15, a first reception resonator 25 and a second reception resonator 26, and a wireless power reception module 27.

The wireless charging device may be constituted with the first reception resonator 25 and the second reception resonator 26, and the wireless power reception module 27.

The first reception resonator 25 and the second reception resonator 26 may be mounted in the first strap 12 and the second strap 13, respectively, to receive power transmitted from an external transmission resonator (not illustrated).

The wireless power reception module 27 may be mounted in the first buckle 14 to be electrically connected to the reception resonator.

That is, the first reception resonator 25 and the second reception resonator 26 may be mounted along the shapes of the first strap 12 and the second strap 13, respectively.

The first reception resonator 25 mounted in the first strap 12 may be electrically connected to the wireless power reception module 27 mounted in the first buckle 14.

The reception resonator mounted in the first strap may be electrically connected to the wireless power reception module mounted in the first buckle, and the other reception resonator mounted in the second strap may be mounted to be independently separated from the reception resonator of the first strap and the wireless power reception module.

For example, the second reception resonator 26 is mounted to be independently separated from the first reception resonator 25 and the wireless power reception module 27.

The second reception resonator 26 is mounted in the second strap 13 and at the same time, is physically separated from the second reception resonator 26 mounted in the first strap 12. Although the first reception resonator 25 and the second reception resonator 26 are physically separated from each other, the first reception resonator 25 and the second reception resonator 26 have a high combination coefficient due to a very small distance therebetween. Accordingly, the second reception resonator 26 may wirelessly forward, to the first reception resonator 25, power transmitted from the outside. Furthermore, the first reception resonator 25 may independently and wirelessly receive power transmitted from the outside.

In addition, the first reception resonator 25 of the first strap 12 and the second reception resonator 26 of the second strap 13 may be electrically connected to each other through a connector (not illustrated) included in the housing 11. That is, the second reception resonator 26 may transmit external power to the first reception resonator 25 through the connector (not illustrated).

Accordingly, the wireless power reception module 27 rectifies AC power induced via the first reception resonator 25 and the second reception resonator 26 to DC power through the rectifier 351 (illustrated in FIG. 22) to output the DC power, and supplies the output DC power to the battery pack R1 (illustrated in FIG. 22) included in the wearable device 10 to charge the battery pack.

As described above, the first reception resonator 25 and the second reception resonator 26 are mounted in the first strap 12 and the second strap 13, respectively, so that the power reception of the first reception resonator 25 and the second reception resonator 26 can be further enhanced, thereby further improving a charging function of the wireless charging device. Furthermore, the wireless power reception module 27 is mounted in the first buckle 14, thereby making the housing 11 slimmer and smaller.

Figure 8:
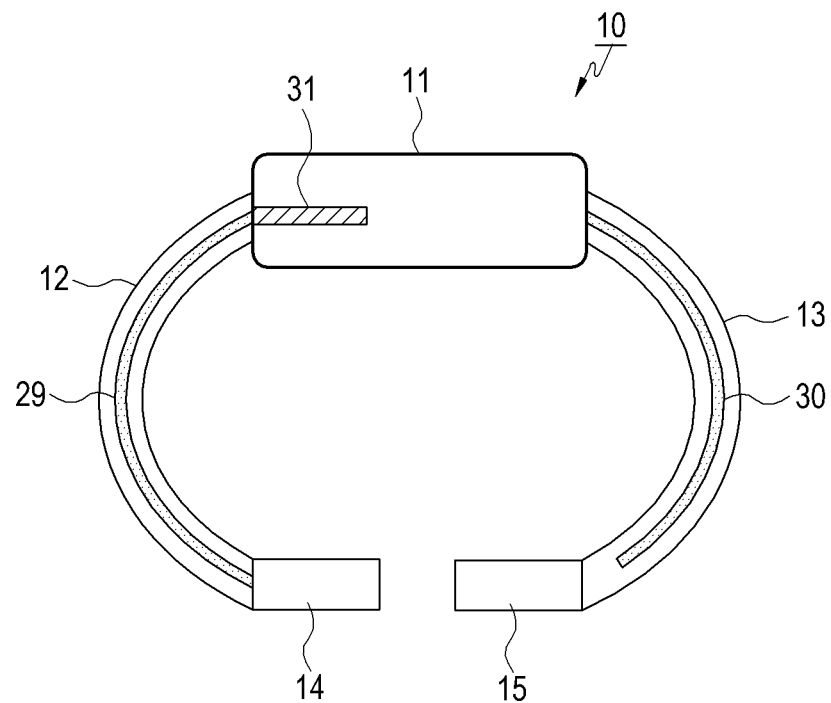
FIG. 8 is a side sectional view illustrating a configuration of a wearable device including a wireless charging device according to yet another embodiment of the present disclosure.

FIG. 8 illustrates a wearable device 10 including a wireless charging device according to yet another embodiment ('a sixth embodiment') of the present disclosure.

FIG. 8 is a side sectional view illustrating a configuration of the wearable device 10 including the wireless charging device according to the sixth embodiment of the present disclosure.

As illustrated in FIG. 8, the wearable device 10 includes a housing 11 of the wearable device 10, a first strap 12, a second strap 13, a first buckle 14, a second buckle 15, a first reception resonator 29, a second reception resonator 30, and a wireless power reception module 31.

The wireless charging device may be constituted with the first reception resonator 29, the second reception resonator 30, and the wireless power reception module 31.

The first reception resonator 29 and the second reception resonator 30 may be mounted in the first strap 12 and the second strap 13, respectively, to receive power transmitted from external transmission resonators (not illustrated).

The wireless power reception module 31 may be mounted in the housing 11 to be electrically connected to the first reception resonator 29 and the second reception resonator 30.

That is, the first reception resonator 29 and the second reception resonator 30 may be mounted along the shapes of the first strap 12 and the second strap 13, respectively.

The first reception resonator 29 mounted in the first strap 12 may be electrically connected to the wireless power reception module 31 mounted in the housing 11.

The reception resonator mounted in the first strap may be electrically connected to the wireless power reception module mounted in the housing, and the other reception resonator mounted in the second strap may be mounted to be independently separated from the reception resonator of the first strap and the wireless power reception module.

For example, the other reception resonator is mounted to be independently separated from the reception resonator and the wireless power reception module.

The second reception resonator 30 is mounted in the second strap 13 and at the same time, is physically separated from the first reception resonator 29 mounted in the first strap 12. Although the first reception resonator 29 and the second reception resonator 30 are physically separated from each other, the first reception resonator 29 and the second reception resonator 30 have a high combination coefficient due to a very small distance therebetween. Accordingly, the second reception resonator 30 may wirelessly forward, to the first reception resonator 29, power transmitted from the outside. Furthermore, the first reception resonator 29 may independently and wirelessly receive power transmitted from the outside.

In addition, the wireless power reception module 31 mounted in the housing 11 and the second reception resonator 30 of the second strap 13 may be electrically connected to each other through a connector (not illustrated) included in the housing 11. That is, the second reception resonator 30 may transmit external power to the wireless power reception module 31 through the connector (not illustrated).

The wireless power reception module 31 rectifies AC power induced via the first reception resonator 29 and the second reception resonator 30 to DC power through the rectifier 351 (illustrated in FIG. 22) to output the DC power, and supplies the output DC power to the battery pack R1 (illustrated in FIG. 22) included in the wearable device 10 to charge the battery pack.

As described above, the wireless power reception module 31 is independently mounted in the housing 11, thereby making the housing 11 slimmer and smaller, and the first reception resonator 29 and the second reception resonator 30 are mounted in the first strap 12 and the second strap 13, respectively, so that the power reception of the first reception resonator 29 and the second reception resonator 30 can be further enhanced, thereby further improving a charging function of the wireless charging device. In addition, the second reception resonator 30 mounted in the second strap 13 is electrically connected to the wireless power reception module 31 through the connector (not illustrated) mounted in the housing 11, thereby facilitating the electrical connection between the second reception resonator 30 and the wireless power reception module 31.

Figure 9:
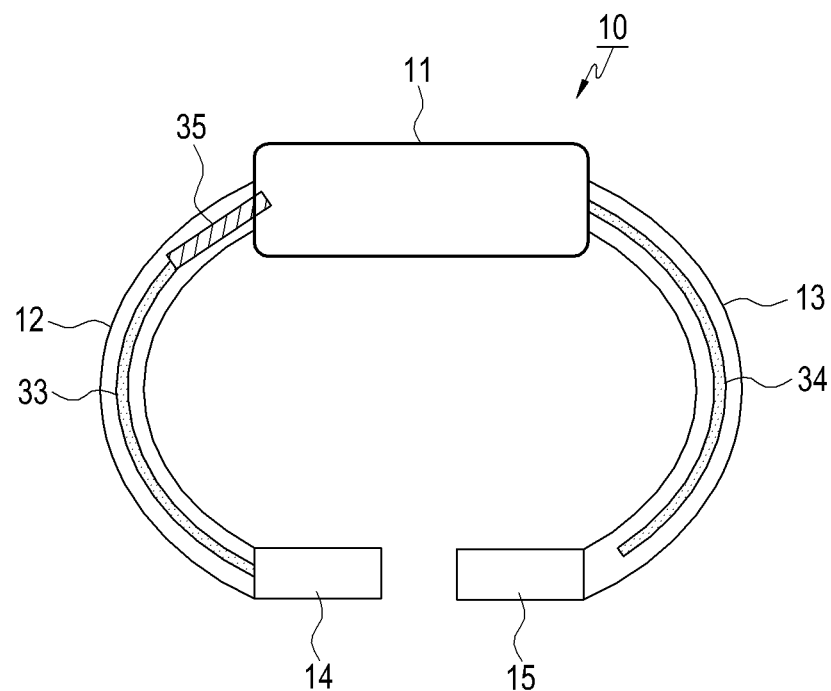
FIG. 9 is a side sectional view illustrating a configuration of a wearable device including a wireless charging device according to yet another embodiment of the present disclosure.

FIG. 9 illustrates a wearable device 10 including a wireless charging device according to yet another embodiment ('a seventh embodiment') of the present disclosure.

FIG. 9 is a side sectional view illustrating a configuration of the wearable device 10 including the wireless charging device according to the seventh embodiment of the present disclosure.

As illustrated in FIG. 9, the wearable device 10 includes a housing 11 of the wearable device 10, a first strap 12, a second strap 13, a first buckle 14 and a second buckle 15, reception resonators 33 and 34, and a wireless power reception module 35.

The wireless charging device may be constituted with the reception resonators 33, 34 and the wireless power reception module 35.

The reception resonators 33 and 34 may be mounted in the first strap 12 and the second strap 13, respectively, to receive power transmitted from external transmission resonator (not illustrated).

The reception resonators 33 and 34 may be mounted along the shapes of the first strap 12 and the second strap 13, respectively.

The wireless power reception module 35 may be mounted in the first strap 12 to be electrically connected to the reception resonator 33.

The reception resonator 33 mounted in the first strap 12 is electrically connected to the wireless power reception module 35 mounted in the first strap 12.

The other reception resonator mounted in the second strap may be mounted to be independently separated from the reception resonator and the wireless power reception module that are mounted in the first strap.

For example, the other reception resonator is mounted to be independently separated from the reception resonator and the wireless power reception module.

The other reception resonator 34 is mounted in the second strap 13 and at the same time, is physically separated from the reception resonator 33 mounted in the first strap 12. Although the reception resonators 33 and 34 are physically separated from each other, the reception resonators 33 and 34 have a high combination coefficient due to a very small distance therebetween. Accordingly, the other reception resonator 34 may wirelessly forward, to the reception resonator 33, power transmitted from the outside. Furthermore, the reception resonator 33 may independently and wirelessly receive power transmitted from the outside.

In addition, the wireless power reception module 35 mounted in the first strap 12 and the other reception resonator 34 of the second strap 13 may be electrically connected to each other through a connector (not illustrated) included in the housing 11. That is, the other reception resonator 34 may transmit external power to the wireless power reception module 35 through the connector (not illustrated).

The wireless power reception module 35 rectifies AC power induced via the reception resonators 33 and 34 to DC power through the rectifier 351 (illustrated in FIG. 22) to output the DC power, and supplies the output DC power to the battery pack R1 (illustrated in FIG. 22) included in the wearable device 10 to charge the battery pack.

As described above, the reception resonator 33 and the wireless power reception module 35 are mounted in the first strap, and the other reception resonator 34 is mounted in the second strap, thereby making the housing 11 slimmer and smaller and facilitating the mounting of the reception resonators 33, 34 and the wireless power reception module 35.

Figure 10:
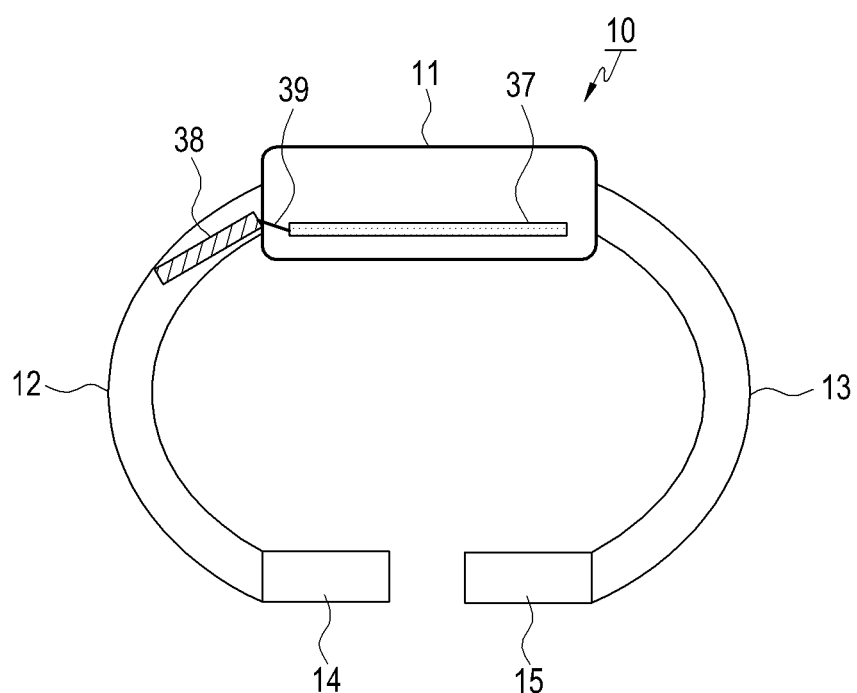
FIG. 10 is a side sectional view illustrating a configuration of a wearable device including a wireless charging device according to yet another embodiment of the present disclosure.

FIG. 10 illustrates a wearable device 10 including a wireless charging device according to yet another embodiment ('an eighth embodiment') of the present disclosure.

FIG. 10 is a side sectional view illustrating a configuration of the wearable device 10 including the wireless charging device according to the eighth embodiment of the present disclosure.

As illustrated in FIG. 10, the wearable device 10 includes a housing 11 of the wearable device 10, a first strap 12, a second strap 13, a first buckle 14 and a second buckle 15, a reception resonator 37, and a wireless power reception module 38.

The wireless charging device may be constituted with the reception resonator 37 and the wireless power reception module 38.

The reception resonator 37 may be mounted in the housing 11 to receive power transmitted from an external transmission resonator (not illustrated).

The wireless power reception module 38 may be mounted in the first strap 12 to be electrically connected to the reception resonator 37.

A connector 39 is provided in the housing 11 to electrically interconnect the wireless power reception module 38 mounted in the first strap 12 and the reception resonator 37 mounted in the housing 11.

In other words, one end of the connector 39 is electrically connected to the wireless power reception module 38 mounted in the first strap 12, and the other end of the connector 39 is electrically connected to the reception resonator 37 mounted in the housing 11.

The wireless power reception module 38 rectifies AC power induced via the reception resonator 37 to DC power through the rectifier 351 (illustrated in FIG. 22) to output the DC power, and supplies the output DC power to the battery pack R1 (illustrated in FIG. 22) included in the wearable device 10 to charge the battery pack.

As described above, the wireless power reception module 38 is independently mounted in the first strap 12, and the reception resonator 37 is independently mounted in the housing 11, thereby making the housing 11 and the first strap 12 and the second strap 13 slimmer and smaller. In addition, the housing 11 includes the connector 39 which electrically interconnects the wireless power reception module 38 and the reception resonator 37, thereby facilitating the electrical connection between the wireless power reception module 38 and the reception resonator 37.

Figure 11:
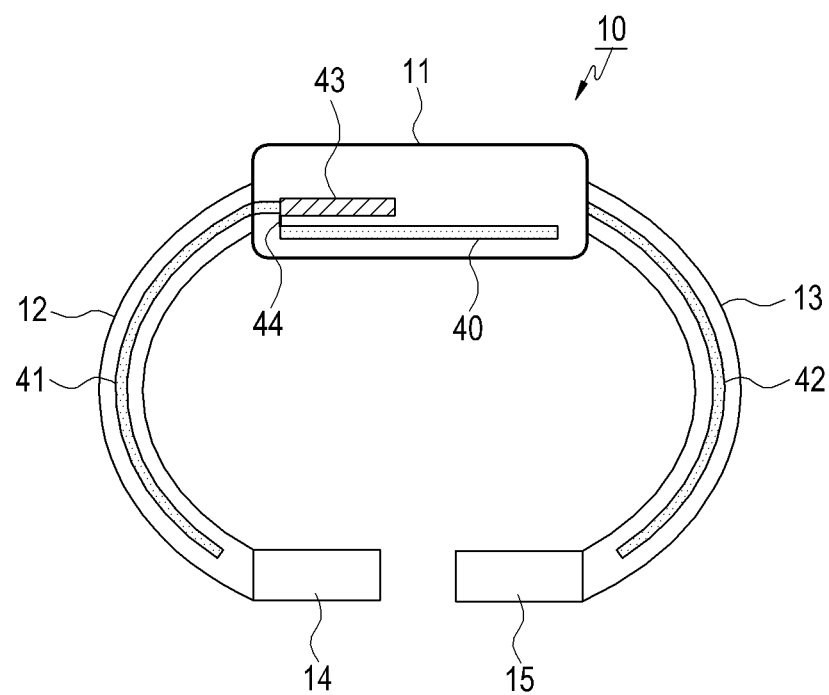
FIG. 11 is a side sectional view illustrating a configuration of a wearable device including a wireless charging device according to yet another embodiment of the present disclosure.

FIG. 11 illustrates a wearable device 10 including a wireless charging device according to yet another embodiment ('a ninth embodiment') of the present disclosure.

FIG. 11 is a side sectional view illustrating a configuration of the wearable device 10 including the wireless charging device according to the ninth embodiment of the present disclosure.

As illustrated in FIG. 11, the wearable device 10 includes a housing 11 of the wearable device 10, a first strap 12, a second strap 13, a first buckle 14 and a second buckle 15, a first reception resonator 40, a second reception resonator 41, and a third reception resonator 42, and a wireless power reception module 43.

The wireless charging device may be constituted with the first reception resonator 40, the second reception resonator 41, the third reception resonator 42, and the wireless power reception module 43.

The first reception resonator 40, the second reception resonator 41, and the third reception resonator 42 may be mounted in the housing 11 and the first strap 12 and the second strap 13, respectively, to receive power transmitted from external transmission resonators (not illustrated).

For example, the first reception resonator 40 is mounted in the housing 11, and the second reception resonator 41 and the third reception resonator 42 are mounted in the first strap 12 and the second strap 13, respectively.

A connector 44 may be provided in the housing 11 to electrically interconnect the wireless power reception module 43 and the first reception resonator 40 mounted in the housing 11.

That is, one end of the connector 44 is electrically connected to the wireless power reception module 43, and the other end of the connector 44 is electrically connected to the first reception resonator 40 mounted in the housing 11.

The second reception resonator mounted in the first strap may be electrically connected to the wireless power reception module mounted in the housing, and the third reception resonator mounted in the second strap may be mounted to be independently separated from the second reception resonator of the first strap and the wireless power reception module.

For example, the third reception resonator is mounted to be independently separated from the first and second reception resonators and the wireless power reception module.

The third reception resonator 42 is mounted in the second strap 13 and at the same time, is physically separated from the second reception resonator 41 mounted in the first strap 12. Although the second reception resonator 41 and the third reception resonator 42 are physically separated from each other, the second reception resonator 41 and the third reception resonator 42 have a high combination coefficient due to a very small distance therebetween. Accordingly, the third reception resonator 42 may wirelessly forward, to the second reception resonator 41, power transmitted from the outside. Furthermore, the second reception resonator 41 may independently and wirelessly receive power transmitted from the outside.

In addition, the wireless power reception module 43 mounted in the housing 11 and the third reception resonator 42 of the second strap 13 may be electrically connected to each other through another connector (not illustrated) included in the housing 11. That is, the third reception resonator 42 may transmit external power to the wireless power reception module 43 through the other connector (not illustrated).

The wireless power reception module 43 rectifies AC power induced via the first reception resonator 40, the second reception resonator 41 and the third reception resonator 42 to DC power through the rectifier 351 (illustrated in FIG. 22) to output the DC power, and supplies the output DC power to the battery pack R1 (illustrated in FIG. 22) included in the wearable device 10 to charge the battery pack.

As described above, the first reception resonator 40, the second reception resonator 41 and the third reception resonator 42 are independently mounted in the housing 11, the first strap 12 and the second strap 13, thereby making the housing 11, the first strap 12 and the second strap 13 slimmer and smaller and enhancing power reception of the first reception resonator 40, the second reception resonator 41 and the third reception resonator 42. In addition, due to the enhancement of the power reception, it is possible to improve the wireless charging of the wearable device 10.

Figure 12:
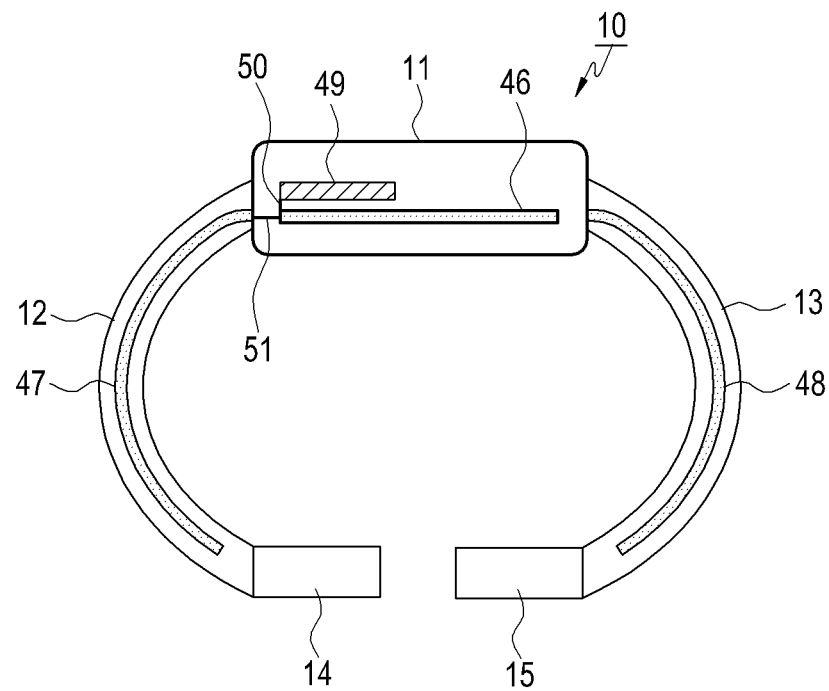
FIG. 12 is a side sectional view illustrating a configuration of a wearable device including a wireless charging device according to yet another embodiment of the present disclosure.

FIG. 12 illustrates a wearable device 10 including a wireless charging device according to yet another embodiment ('a tenth embodiment') of the present disclosure.

FIG. 12 is a side sectional view illustrating a configuration of the wearable device 10 including the wireless charging device according to the tenth embodiment of the present disclosure.

As illustrated in FIG. 12, the wearable device 10 includes a housing 11 of the wearable device 10, a first strap 12, a second strap 13, a first buckle 14 and a second buckle 15, a first reception resonator 46, a second reception resonator 47, and a third reception resonator 48, and a wireless power reception module 49.

The wireless charging device may be constituted with the first reception resonator 46, the second reception resonator 47, the third reception resonator 48, and the wireless power reception module 49.

The first reception resonator 46, the second reception resonator 47, and the third reception resonator 48 may be mounted in the housing 11 and the first strap 12 and the second strap 13, respectively, to receive power transmitted from external transmission resonators (not illustrated).

For example, the first reception resonator 46 is mounted in the housing 11, the second reception resonator 47, and the third reception resonator 48 are mounted in the first strap 12 and the second strap 13, respectively.

A first connector 50 may be provided in the housing 11 to electrically interconnect the wireless power reception module 49 and the first reception resonator 46 mounted in the housing 11.

That is, one end of the first connector 50 is electrically connected to the wireless power reception module 49, and the other end of the first connector 50 is electrically connected to the first reception resonator 46 mounted in the housing 11.

Furthermore, a second connector 51 may be provided in the housing 11 to electrically interconnect the first reception resonator 46 mounted in the housing 11 and the second reception resonator 47 mounted in the first strap.

One end of the second connector 51 is electrically connected to the first reception resonator 46 mounted in the housing 11, and the other end of the second connector 51 is electrically connected to the second reception resonator 47 mounted in the first strap 12.

The second reception resonator mounted in the first strap is electrically connected to the first reception resonator mounted in the housing through the second connector, and the third reception resonator mounted in the second strap may be mounted to be independently separated from the first reception resonator of the housing, the second reception resonator of the first strap, and the wireless power reception module.

For example, the third reception resonator is mounted to be independently separated from the first and second reception resonators and the wireless power reception module.

The third reception resonator 48 is mounted in the second strap 13 and at the same time, is physically separated from the second reception resonator 47 mounted in the first strap 12. Although the second reception resonator 47 is physically separated from the third reception resonator 48, the second reception resonator 47, and the third reception resonator 48 have a high combination coefficient due to a very small distance therebetween. Accordingly, the third reception resonator 48 may wirelessly forward, to the second reception resonator 47, power transmitted from the outside. Furthermore, the second reception resonator 47 may independently and wirelessly receive power transmitted from the outside.

In addition, the first reception resonator 46 mounted in the housing 11 and the third reception resonator 48 of the second strap 13 may be electrically connected to each other through another connector (not illustrated) included in the housing 11.

In this state, the wireless power reception module 49 rectifies AC power induced via the first reception resonator 46, the second reception resonator 47, and the third reception resonator 48 to DC power through the rectifier 351 (illustrated in FIG. 22) to output the DC power, and supplies the output DC power to the battery pack R1 (illustrated in FIG. 22) included in the wearable device 10 to charge the battery pack.

As described above, the first reception resonator 46, the second reception resonator 47, and the third reception resonator 48 are independently mounted in the housing 11 and the first strap 12 and the second strap 13, thereby making the housing 11 and the first strap 12 and the second strap 13 slimmer and smaller and enhancing power reception of the first reception resonator 46, the second reception resonator 47, and the third reception resonator 48. In addition, due to the enhancement of the power reception, it is possible to improve the wireless charging of the wearable device 10.

Figure 13:
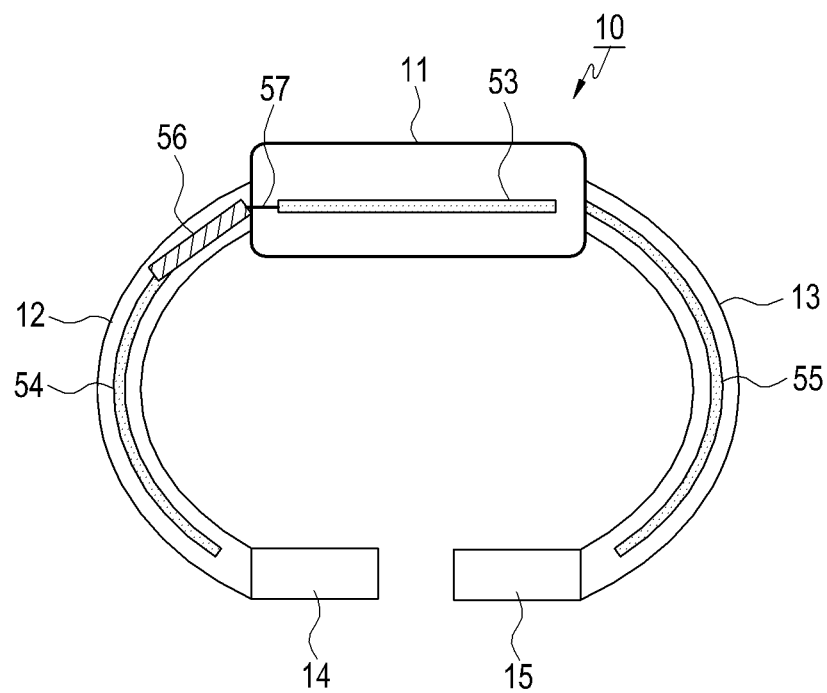
FIG. 13 is a side sectional view illustrating a configuration of a wearable device including a wireless charging device according to yet another embodiment of the present disclosure.

FIG. 13 illustrates a wearable device 10 including a wireless charging device according to yet another embodiment ('an eleventh embodiment') of the present disclosure.

FIG. 13 is a side sectional view illustrating a configuration of the wearable device 10 including the wireless charging device according to the eleventh embodiment of the present disclosure.

As illustrated in FIG. 13, the wearable device 10 includes a housing 11 of the wearable device 10, a first strap 12, a second strap 13, a first buckle 14 and a second buckle 15, a first reception resonator 53, a second reception resonator 54, and a third reception resonator 55, and a wireless power reception module 56.

The wireless charging device may be constituted with the first reception resonator 53, the second reception resonator 54, and the third reception resonator 55, and the wireless power reception module 56.

The first reception resonator 53, the second reception resonator 54, and the third reception resonator 55 may be mounted in the housing 11 and the first strap 12 and the second strap 13, respectively, to receive power transmitted from an external transmission resonator (not illustrated).

The second reception resonator 54 and the wireless power reception module 56 may be mounted together in the first strap 12.

For example, the first reception resonator 53 is mounted in the housing 11, and the second reception resonator 54 and the third reception resonator 55 are mounted in the first strap 12 and the second strap 13, respectively.

A connector 57 may be provided at one end of the first reception resonator 53 to electrically interconnect the first reception resonator 53 and the wireless power reception module 56 mounted in the first strap 12.

That is, one end of the connector 57 is electrically connected to the wireless power reception module 56 mounted in the first strap 12, and the other end of the connector 57 is electrically connected to the first reception resonator 53 mounted in the housing 11.

The second reception resonator mounted in the first strap may be electrically connected to the wireless power reception module mounted in the first strap, and the third reception resonator mounted in the second strap may be mounted to be independently separated from the first reception resonator mounted in the housing, the second reception resonator mounted in the first strap, and the wireless power reception module.

For example, the third reception resonator is mounted to be independently separated from the first and second reception resonators and the wireless power reception module.

The third reception resonator 55 is mounted in the second strap 13 and at the same time, is physically separated from the second reception resonator 54 mounted in the first strap 12. Although the second reception resonator 54, and the third reception resonator 55 are physically separated from each other, the second reception resonator 54, and the third reception resonator 55 have a high combination coefficient due to a very small distance therebetween. Accordingly, the third reception resonator 55 may wirelessly forward, to the second reception resonator 54, power transmitted from the outside. Furthermore, the second reception resonator 54 may independently and wirelessly receive power transmitted from the outside.

In addition, the first reception resonator 53 mounted in the housing and the third reception resonator 55 of the second strap 13 may be electrically connected to each other through another connector (not illustrated) included in the housing 11.

In this state, the wireless power reception module 56 rectifies AC power induced via the first reception resonator 53, the second reception resonator 54, and the third reception resonator 55 to DC power through the rectifier 351 (illustrated in FIG. 22) to output the DC power, and supplies the output DC power to the battery pack R1 (illustrated in FIG. 22) included in the wearable device 10 to charge the battery pack.

As described above, the first reception resonator 53, the second reception resonator 54, and the third reception resonator 55 are independently mounted in the housing 11 and the first strap 12 and the second strap 13, and the wireless power reception module 56 is mounted in the first strap 12, thereby making the housing 11 slimmer and smaller and enhancing power reception of the first reception resonator 53, the second reception resonator 54, and the third reception resonator 55. In addition, due to the enhancement of the power reception, it is possible to improve the wireless charging of the wearable device 10.

Figure 14:
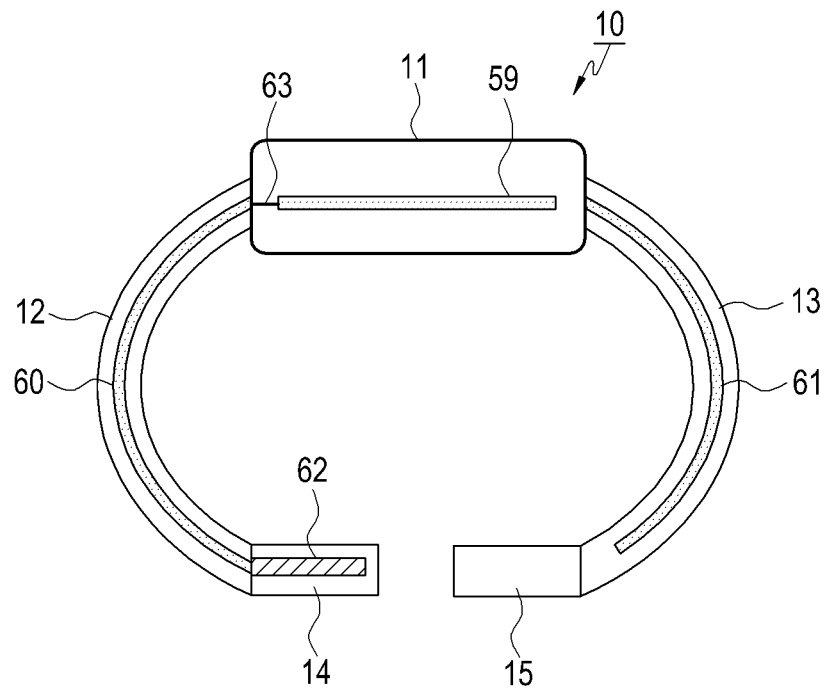
FIG. 14 is a side sectional view illustrating a configuration of a wearable device including a wireless charging device according to yet another embodiment of the present disclosure.

FIG. 14 illustrates a wearable device 10 including a wireless charging device according to yet another embodiment ('a twelfth embodiment') of the present disclosure.

FIG. 14 is a side sectional view illustrating a configuration of the wearable device 10 including the wireless charging device according to the twelfth embodiment of the present disclosure.

As illustrated in FIG. 14, the wearable device 10 includes a housing 11 of the wearable device 10, a first strap 12, a second strap 13, a first buckle 14 and a second buckle 15, a first reception resonator 59, a second reception resonator 60, and a third reception resonator 61, and a wireless power reception module 62.

The wireless charging device may be constituted with the first reception resonator 59, the second reception resonator 60, and the third reception resonator 61, and the wireless power reception module 62.

The first reception resonator 59, the second reception resonator 60, and the third reception resonator 61 may be mounted in the housing 11 and the first strap 12 and the second strap 13, respectively, to receive power transmitted from an external transmission resonator (not illustrated).

The wireless power reception module 62 may be mounted in the first buckle 14 to be electrically connected to the second reception resonator 60 mounted in the first strap 12.

For example, the first reception resonator 59 is mounted in the housing 11, and the second reception resonator 60 and the third reception resonator 61 are mounted in the first strap 12 and the second strap 13, respectively.

A connector 63 may be provided at one end of the first reception resonator 59 to electrically interconnect the first reception resonator 59 and the second reception resonator 60 mounted in the first strap 12.

That is, one end of the connector 63 is electrically connected to the second reception resonator 60 mounted in the first strap 12, and the other end of the connector 63 is electrically connected to the first reception resonator 59 mounted in the housing 11.

The second reception resonator mounted in the first strap may be electrically connected to the wireless power reception module mounted in the first buckle, and the third reception resonator mounted in the second strap may be mounted to be independently separated from the first reception resonator mounted in the housing, the second reception resonator mounted in the first strap, and the wireless power reception module.

For example, the third reception resonator is mounted to be independently separated from the first and second reception resonators and the wireless power reception module.

The third reception resonator 61 is mounted in the second strap 13 and at the same time, is physically separated from the second reception resonator 60 mounted in the first strap 12. Although the second reception resonator 60 is physically separated from the third reception resonator 61, the second reception resonator 60 and the third reception resonator 61 have a high combination coefficient due to a very small distance therebetween. Accordingly, the third reception resonator 61 may wirelessly forward, to the second reception resonator 60, power transmitted from the outside. Furthermore, the second reception resonator 60 may independently and wirelessly receive power transmitted from the outside.

In addition, the first reception resonator 59 mounted in the housing 11 and the third reception resonator 61 of the second strap 13 may be electrically connected to each other through another connector (not illustrated) included in the housing 11.

In this state, the wireless power reception module 62 rectifies AC power induced via the first reception resonator 59, the second reception resonator 60, and the third reception resonator 61 to DC power through the rectifier 351 (illustrated in FIG. 22) to output the DC power, and supplies the output DC power to the battery pack R1 (illustrated in FIG. 22) included in the wearable device 10 to charge the battery pack.

As described above, one end of the second reception resonator 60 is electrically connected to the wireless power reception module 62, and the other end of the second reception resonator 60 is electrically connected to the first reception resonator 59 mounted in the housing 11 through the connector 63.

The first reception resonator 59, the second reception resonator 60, and the third reception resonator 61 are independently mounted in the housing 11 and the first strap 12 and the second strap 13, and the wireless power reception module 62 is mounted in the first buckle 14, thereby making the housing 11 slimmer and smaller and enhancing power reception of the first reception resonator 59, the second reception resonator 60, and the third reception resonator 61. In addition, due to the enhancement of the power reception, it is possible to improve the wireless charging of the wearable device 10.

Figure 15:
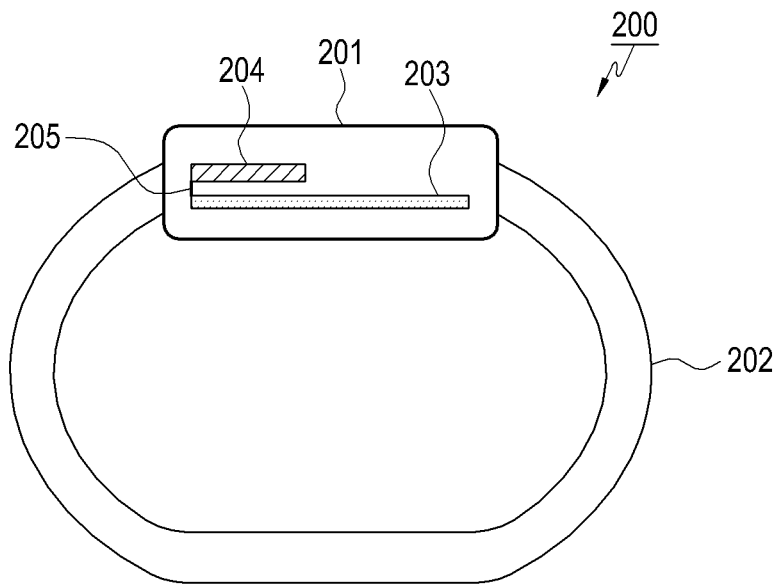
FIG. 15 is a side sectional view illustrating a configuration of a wearable device including a wireless charging device according to yet another embodiment of the present disclosure.

FIG. 15 is a side sectional view illustrating a configuration of a wearable device 200 including a wireless charging device according an embodiment ('a thirteenth embodiment') of the present disclosure.

Referring to FIG. 15, the wearable device 200 including the wireless charging device includes a housing 201 of the wearable device 200, a strap 202, a reception resonator 203, and a wireless power reception module 204.

The wireless charging device may be constituted with the reception resonator 203 and the wireless power reception module 204.

The housing 201 is configured such that the reception resonator 203 and the wireless power reception module 204, which will be described below, are mounted therein.

The strap 202 is connected to opposite sides of the housing 201 to surround a user's body and wrist without a buckle.

The reception resonator 203 is provided in the housing 201 to receive power transmitted from an external wireless charging device.

The wireless power reception module 204 is provided in the housing 201 and is electrically connected to the reception resonator 203.

That is, the wireless power reception module 204 rectifies AC power induced via the reception resonator 203 to DC power through the rectifier 351 (illustrated in FIG. 22) to output the DC power, and supplies the output DC power to the battery pack R1 (illustrated in FIG. 22) included in the wearable device 200 to charge the battery pack.

Here, the external wireless charging device (not illustrated) includes a power amplifier, and the power amplifier generates AC power concentrated on a resonant frequency by using DC power of a power supply and an external high-frequency AC power supply. Further, the power amplifier transmits a high-frequency AC waveform to a transmission resonator (not illustrated) to induce a magnetic field.

The reception resonator 203 may receive the AC power induced in the transmission resonator (not illustrated) and apply the received AC power to the wireless power reception module 204, and the wireless power reception module 204 may rectify the AC power through the rectifier 351 (illustrated in FIG. 22) to output DC power and may supply the output DC power to the battery pack (not illustrated) of the wearable device 200 to wireless charge the battery pack.

The strap 202 may be a flexible strap. The strap 202 is described as an example of the strap 202, but the strap 202 is not limited thereto. That is, another flexible material, in addition to the strap 202, may also be employed for the strap 202. For example, the strap 202 may be formed of a resilient member, or a rubber or silicon material.

In other words, the strap 202 may be worn on or separated from a user's body and wrist by using flexibility thereof.

A connector may be provided in the housing 201 to electrically interconnect the reception resonator 203 and the wireless power reception module 204.

According to the embodiment of the present disclosure, the reception resonator 203 and the wireless power reception module 204 are mounted together in the housing 201 of the wearable device 200, with the strap 202 having no separate buckle, thereby facilitating and simplifying the mounting of the reception resonator 203 and the wireless power reception module 204, freely implementing a design shape of the wearable device 200, and achieving an appealing design of the wearable device 200.

Figure 16:
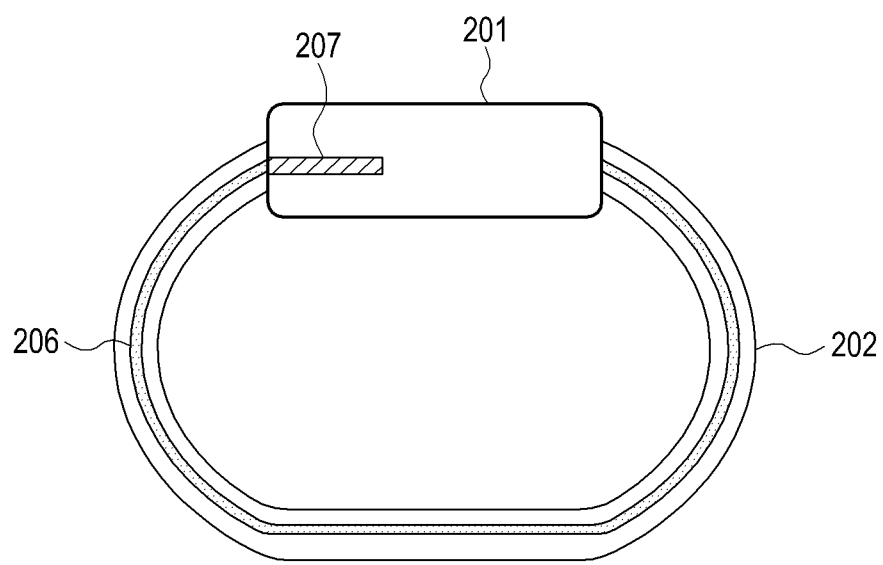
FIG. 16 is a side sectional view illustrating a configuration of a wearable device including a wireless charging device according to yet another embodiment of the present disclosure.

FIG. 16 is a side sectional view illustrating a configuration of a wearable device 200 including a wireless charging device according an embodiment ('a fourteenth embodiment') of the present disclosure.

Referring to FIG. 16, the wearable device 200 including the wireless charging device includes a housing 201 of the wearable device 200, a strap 202, a reception resonator 206, and a wireless power reception module 207.

The wireless charging device may be constituted with the reception resonator 206 and the wireless power reception module 207.

The housing 201 is configured such that the wireless power reception module 207, which will be described below, is mounted therein.

The strap 202 is connected to opposite sides of the housing 201 to surround a user's body and wrist without a buckle.

In other words, one end of the strap is connected to one side of the housing 201, and the other end of the strap is connected to an opposite side of the housing 201.

The reception resonator 206 is provided in the strap 202 to receive power transmitted from an external wireless charging device.

The reception resonator 206 may be mounted along the peripheral shape or a periphery of the strap 202 without a buckle.

Likewise, one end of the reception resonator 206 is connected to one side of the housing 201 and at the same time, is electrically connected to the wireless power reception module 207 mounted in the housing 201, and the other end of the reception resonator 206 is connected to an opposite side of the housing 201.

That is, the wireless power reception module 207 mounted in the housing 201 rectifies AC power induced via the reception resonator 206 to DC power through the rectifier 351 (illustrated in FIG. 22) to output the DC power, and supplies the output DC power to the battery pack R1 (illustrated in FIG. 22) included in the wearable device 200 to charge the battery pack.

The strap 202 may be a flexible strap, and the strap 202 may be worn on or separated from a user's body and wrist by using flexibility thereof.

According to the embodiment of the present disclosure, the wireless power reception module 207 is independently mounted in the housing, thereby making the housing 201 slim and small, and the reception resonator 206 is independently mounted in the strap 202 having no buckle so that it is possible to freely implement a design shape of the strap 202, thereby achieving an appealing design of the wearable device 200.

Figure 17:
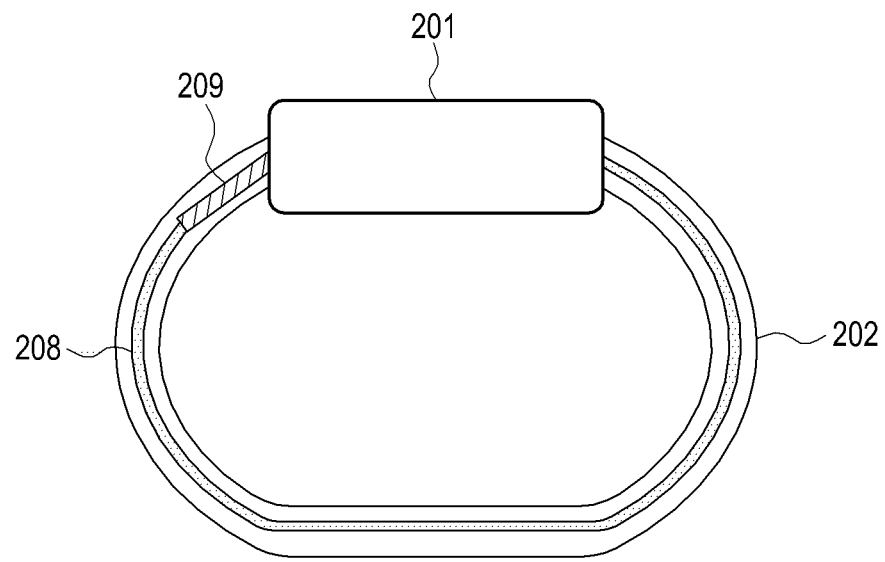
FIG. 17 is a side sectional view illustrating a configuration of a wearable device including a wireless charging device according to yet another embodiment of the present disclosure.

FIG. 17 is a side sectional view illustrating a configuration of a wearable device 200 including a wireless charging device according an embodiment ('a fifteenth embodiment') of the present disclosure.

Referring to FIG. 17, the wearable device 200 including the wireless charging device includes a housing 201 of the wearable device 200, a strap 202, a reception resonator 208, and a wireless power reception module 209.

The wireless charging device may be constituted with the reception resonator 208 and the wireless power reception module 209.

Both the reception resonator 208 and the wireless power reception module 209 may be mounted in the strap 202 without a buckle.

In other words, one end of the strap 202 is connected to one side of the housing 201, and the other end of the strap 202 is connected to an opposite side of the housing 201.

The reception resonator 208 is provided in the strap 202 to receive power transmitted from an external wireless charging device (not illustrated).

The reception resonator 208 and the wireless power reception module 209 may be mounted along the peripheral shape or periphery of the strap 202 without a buckle.

That is, the wireless power reception module 209 mounted in the strap 202 rectifies AC power induced via the reception resonator 208 to DC power through the rectifier 351 (illustrated in FIG. 22) to output the DC power, and supplies the output DC power to the battery pack R1 (illustrated in FIG. 22) included in the wearable device 200 to charge the battery pack.

The strap 202 may be a flexible strap, and the strap 202 may be worn on or separated from a user's body and wrist by using flexibility thereof.

According to the embodiment of the present disclosure, both the reception resonator 208 and the wireless power reception module 209 are mounted together in the strap 202 without a buckle, thereby making the housing 201 slimmer and smaller, freely implementing a design of the wearable device 200, and achieving an appealing design of the wearable device 200.

Figure 18:
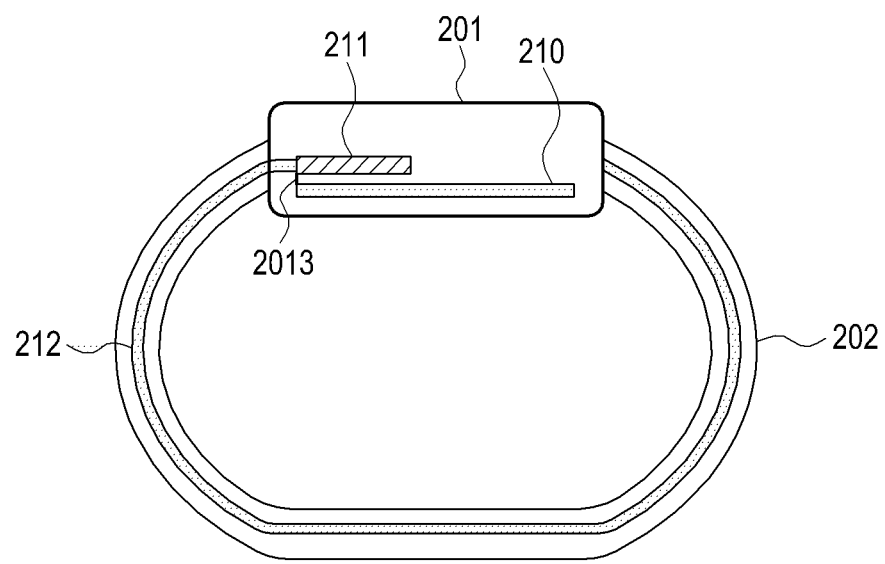
FIG. 18 is a side sectional view illustrating a configuration of a wearable device including a wireless charging device according to yet another embodiment of the present disclosure.

FIG. 18 is a side sectional view illustrating a configuration of a wearable device 200 including a wireless charging device according an embodiment ('a sixteenth embodiment') of the present disclosure.

Referring to FIG. 18, the wearable device 200 including the wireless charging device includes a housing 201 of the wearable device 200, a strap 202, a first reception resonator 210 and a second reception resonator 212, and a wireless power reception module 211.

The wireless charging device may be constituted with the first reception resonator 210, the second reception resonator 212 and the wireless power reception module 211.

Both the first reception resonator 210 and the wireless power reception module 211 may be mounted in the housing 201.

The strap 202 has no separate buckle, and the second reception resonator 212 may be mounted in the strap 202.

In other words, the second reception resonator 212 is electrically connected to the wireless power reception module 211 mounted in the housing 201.

A connector 2013 is provided in the housing 201 to electrically interconnect the first reception resonator 210 mounted in the housing 201 and the wireless power reception module 211.

One end of the connector 2013 is electrically connected to the first reception resonator 210, and the other end of the connector 2013 is electrically connected to the wireless power reception module 211.

For example, the first reception resonator 210 and the second reception resonator 212 are provided in the housing 201 and the strap 202, respectively, to receive power transmitted from an external wireless charging device (not illustrated).

The second reception resonator 212 may be mounted along the peripheral shape or periphery of the strap 202 without a buckle.

That is, the wireless power reception module 211 mounted in the housing 201 rectifies AC power induced via the first reception resonator 210 and the second reception resonator 212 to DC power through the rectifier 351 (illustrated in FIG. 22) to output the DC power, and supplies the output DC power to the battery pack R1 (illustrated in FIG. 22) included in the wearable device 200 to charge the battery pack.

The strap 202 may be a flexible strap, and the strap 202 may be worn on or separated from a user's body and wrist by using flexibility thereof.

According to the embodiment of the present disclosure, the first reception resonator 210 and the wireless power reception module 211 are mounted in the housing 201, and the second reception resonator 212 is mounted in the strap 202 without a buckle, thereby making the housing 201 slimmer and smaller, freely implementing a design of the wearable device 200, and achieving an appealing design of the wearable device 200.

Figure 19:
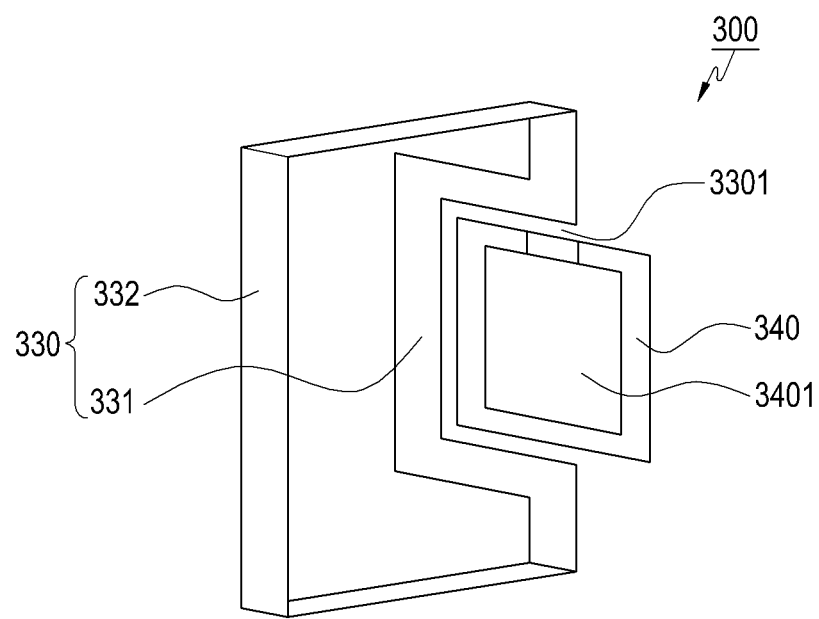
FIG. 19 is a perspective view illustrating a configuration of a wearable device including a wireless charging device according to yet another embodiment of the present disclosure.
Figure 20:
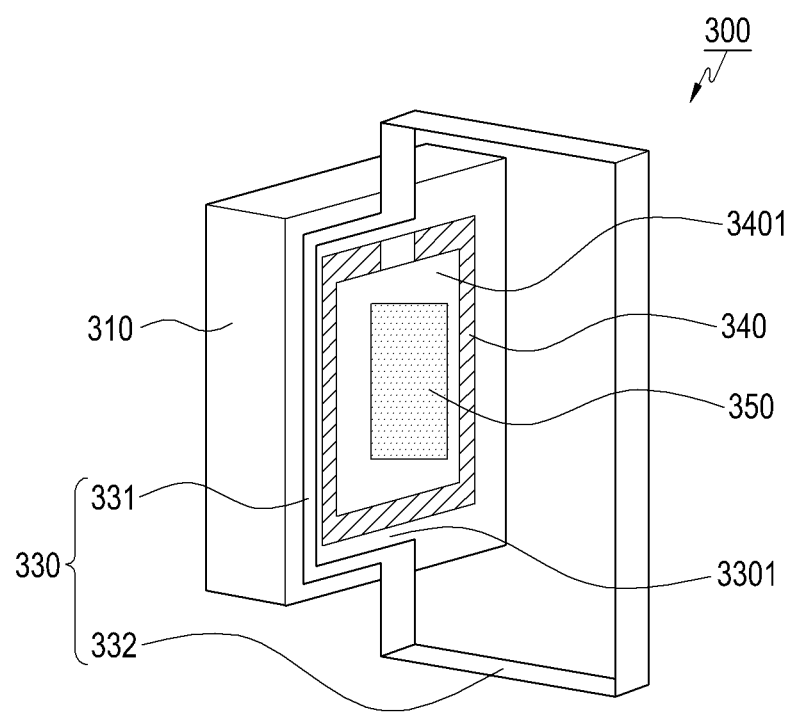
FIG. 20 is a perspective view illustrating a dummy resonator and a reception resonator that are coupled to a housing of the wearable device including the wireless charging device illustrated in FIG. 19.
Figure 21:
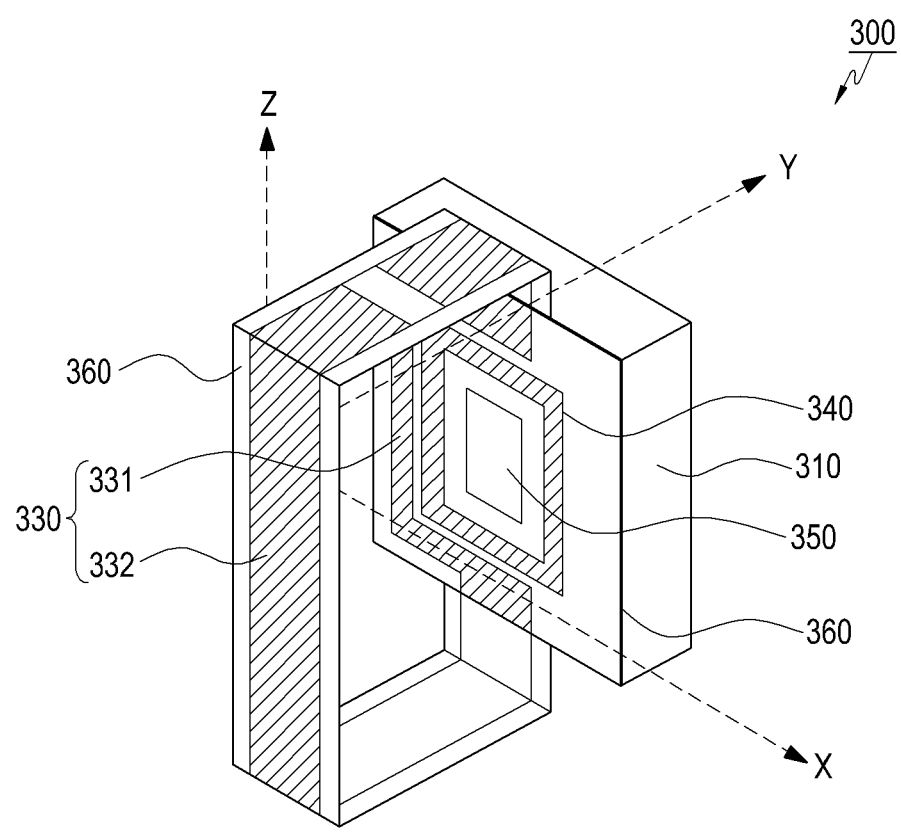
FIG. 21 is a perspective view illustrating a shielding member of the wearable device including the wireless charging device illustrated in FIG. 19.
Figure 22:
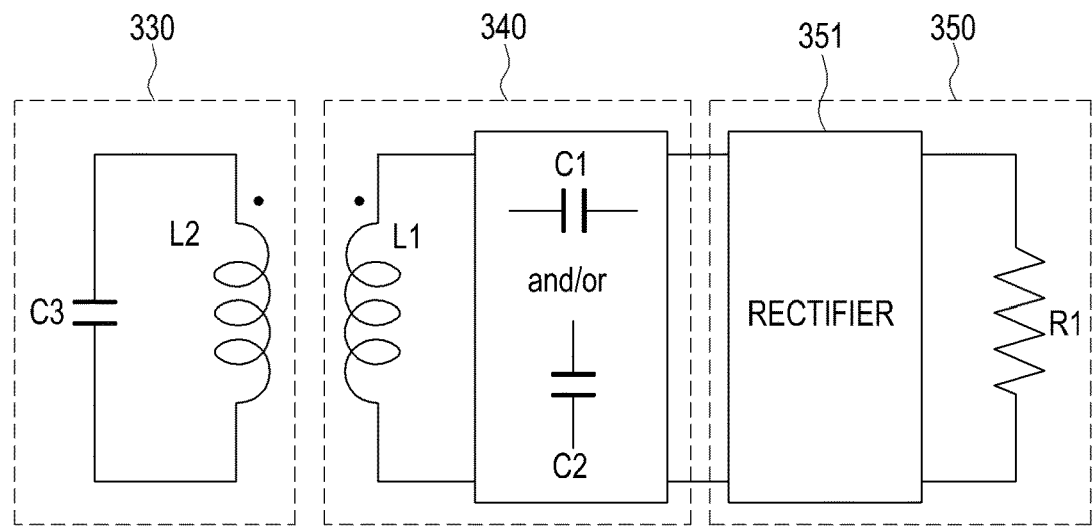
FIG. 22 is a circuit diagram illustrating a configuration of the wearable device including the wireless charging device illustrated in FIG. 19.

FIG. 19 is a perspective view illustrating a configuration of a wearable device 300 including a wireless charging device according to an embodiment ('a seventeenth embodiment') of the present disclosure, FIG. 20 is a perspective view illustrating a dummy resonator 330 and a reception resonator 340 that are coupled to a housing 310 of the wearable device 300 including the wireless charging device, according to an embodiment of the present disclosure, FIG. 21 is a perspective view illustrating a shielding member 360 of the wearable device 300 including the wireless charging device, according to an embodiment of the present disclosure, and FIG. 22 is a circuit diagram illustrating a configuration of the wearable device 300 including the wireless charging device, according to an embodiment of the present disclosure.

First, referring to FIGS. 19 and 20, the wearable device 300 including the wireless charging device includes a housing 310 of the wearable device 300, a strap 320, a dummy resonator 330, a reception resonator 340, and a wireless power reception module 350.

The wireless charging device may be constituted with the dummy resonator 330, the reception resonators 340, and the wireless power reception module 350.

As illustrated in FIG. 22, the dummy resonator 330 may include an inductor L2 and a capacitor C3, and the reception resonator 340 may include an inductor L1 and capacitors C1 and/or C2.

The dummy resonator 330 may include a first dummy resonator 331 and a second dummy resonator 332. The first dummy resonator 331 is mounted in the housing 310 to be isolated from the reception resonator 340 and at the same time, to be disposed adjacent to the reception resonator 340.

The second dummy resonator 332 is mounted in the strap 320 to be electrically connected to the first dummy resonator 331.

The first dummy resonator 331, the reception resonator 340, and the wireless power reception module 350 may be mounted together in the housing 310.

The strap 320 is connected to opposite sides of the housing 310 to surround a user's body and wrist.

The reception resonator 340 is provided in the housing 310 to receive power transmitted from an external wireless charging device (not illustrated).

The wireless power reception module 350 is provided in the housing 310 and is electrically connected to the reception resonator 340.

As illustrated in FIG. 19 mentioned above, the first dummy resonator 331 and the reception resonator 340 have a first opening surface 3301 and a second opening surface 3401, respectively, such that the first dummy resonator 331 and the reception resonator 340 may be isolated and at the same time, may be coupled.

As illustrated in FIG. 21, a shielding member 360 is provided to increase resonance efficiency of the first dummy resonator 331, the second dummy resonator 332, and the reception resonator 340.

As illustrated in FIG. 20, the first dummy resonator 331 and the second dummy resonator 332 may be located to be isolated from the reception resonator 340 and simultaneously electrically connected to the reception resonator 340.

For example, the first dummy resonator 331 and the reception resonator 340 are mounted in the housing 310, and the second dummy resonator 332 is mounted in the strap 320. At the same time, the first dummy resonator 331 and the second dummy resonator 332, and the reception resonator 340 are physically isolated from each other. Although the first dummy resonator 331 and the second dummy resonator 332 and the reception resonator 340 are physically separated from each other, the resonators have a high combination coefficient due to a very small distance therebetween. Accordingly, the first dummy resonator 331 and the second dummy resonator 332 may forward, to the reception resonator 340, power transmitted from the outside. Furthermore, the reception resonator 340 may independently receive the power transmitted from the outside.

For example, as illustrated in FIG. 22, the first dummy resonator 331 and the second dummy resonator 332 may forward, to the reception resonator 340, the power transmitted from the outside, and the wireless power reception module 350 rectifies AC power induced via the reception resonator 340 to DC power through the rectifier 351 to output the DC power, and supplies the output DC power to the battery pack R1 included in the wearable device 300 to charge the battery pack.

As illustrated in FIG. 22, the first dummy resonator 331 and the second dummy resonator 332 may be configured with the inductor L2 and the capacitor C3, and the reception resonator 340 may be configured with the inductor L1 and the capacitors C1 and/or C2, in which the inductors L1 and L2 have a predetermined inductance value, and the capacitors C1, C2, and C3 have a predetermined capacitance value.

The rectifier 351 converts AC power to DC power and outputs the DC power, and the wireless power reception module 350 functions to supply the output DC power to the battery pack R1 and charge the battery pack.

More specifically, the external wireless charging device (not illustrated) includes a power amplifier, and the power amplifier generates AC power concentrated on a resonant frequency by using DC power of a power supply and an external high-frequency AC power supply. Further, the power amplifier transmits a high-frequency AC waveform to a transmission resonator (not illustrated) to induce a magnetic field.

The first dummy resonator 331 and the second dummy resonator 332 may receive AC power induced by the transmission resonator and may forward the received AC power to the reception resonator 340, and the reception resonator 340 may apply the AC power to the rectifier 351 of the wireless power reception module 350. The rectifier 351 may convert the AC power into DC power and may output the DC power. The output DC power may be supplied to the battery pack R1 of the wearable device 300 in order to wirelessly charge the battery pack.

Figure 24:
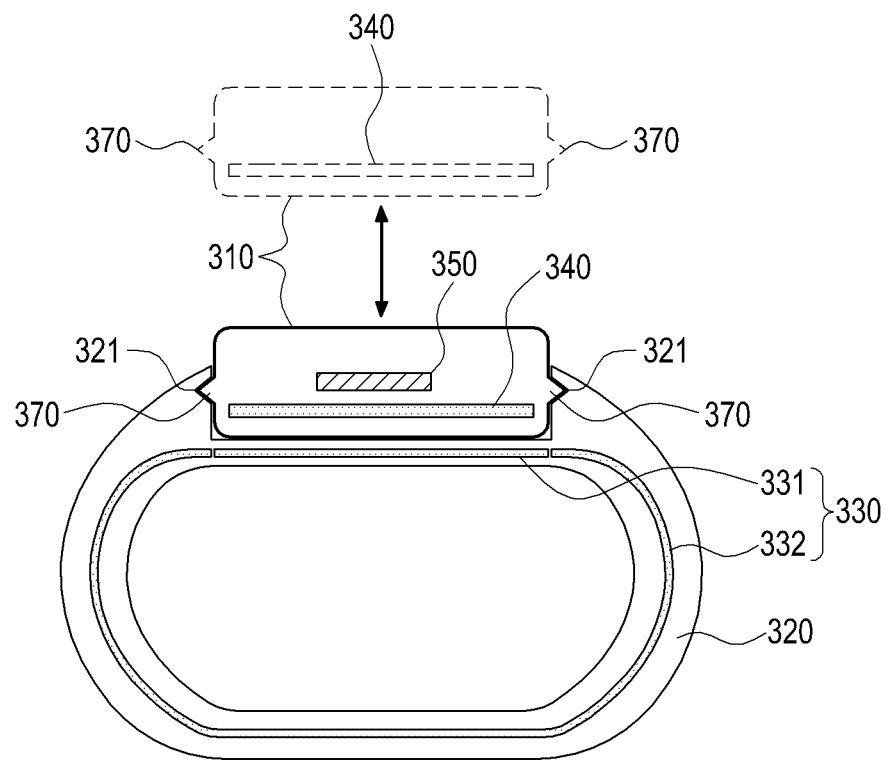
FIG. 24 is a side sectional view illustrating attachment/detachment parts of the wearable device including the wireless charging device illustrated in FIG. 19.

As illustrated in FIG. 24, the housing 310 includes attachment/detachment parts 370 that are attached to and detached from recesses 321 formed in the strap 320.

The attachment/detachment parts 370 are formed of attachment/detachment bosses, and the attachment/detachment bosses are formed in the housing 310 to be attached to and detached from the recesses 321 of the strap 320, which will be described below. In this embodiment, the attachment/detachment bosses are described as an example of the attachment/detachment parts 370, but the attachment/detachment parts 370 are not limited thereto. That is, any device that can be used to attach/detach the housing 310 to/from the strap 320 may be employed as various modified examples.

When the housing 310 and the strap 320 are coupled to each other through the attachment/detachment parts 370, the dummy resonator 330 and the reception resonator 340 are isolated from each other.

For example, the attachment/detachment bosses of the housing 310 are inserted and press-fitted into the recesses 321 of the strap 320, and the reception resonator 340 provided in the housing 310 and the dummy resonator 330 provided in the strap 320 are isolated from each other. In this case, the dummy resonator 330 receives power transmitted from the outside and forwards the received power to the reception resonator 340.

When the housing 310 and the strap 320 are separated from each other, the attachment/detachment bosses of the housing 310 are separated and detached from the recesses 321 of the strap. In this case, the reception resonator 340 provided in the housing 310 independently receives power transmitted from the outside to charge the battery pack R1 provided in the housing 310.

Since a wearable device (not illustrated) including a wireless charging device (not illustrated) that uses a resonator (not illustrated) is charged while being seated on the upper surface of a large-sized and wide charging pad (not illustrated), charging efficiency is rapidly degraded, and the wearable device is not charged when the charging pad and a reception resonator (not illustrated) provided in the wearable device are spaced away from each other, or are misaligned with each other.

In order to overcome the aforementioned problems, in this embodiment, the reception resonator 340 is mounted in the housing 310 of the wearable device 300, and the dummy resonator 330 is mounted in the strap 320. The dummy resonator 330 receives power remotely transmitted from the outside and forwards the received power to the reception resonator 340, which makes it possible to transmit power in 3D wireless transmission (long range) as well as 2D wireless transmission (short range), thereby enhancing power transmission efficiency of a receiver.

Here, the 2D wireless transmission (short range) may mean that wireless transmission is performed while a wearable device is seated on a charging pad, and the 3D wireless transmission (long range) may mean that wireless transmission is performed while a wearable device is spaced far away from a charging pad.

For example, a 2D wireless transmission distance may be 1 cm or less, and a 3D wireless transmission distance may be 10 cm or more.

Figure 23:
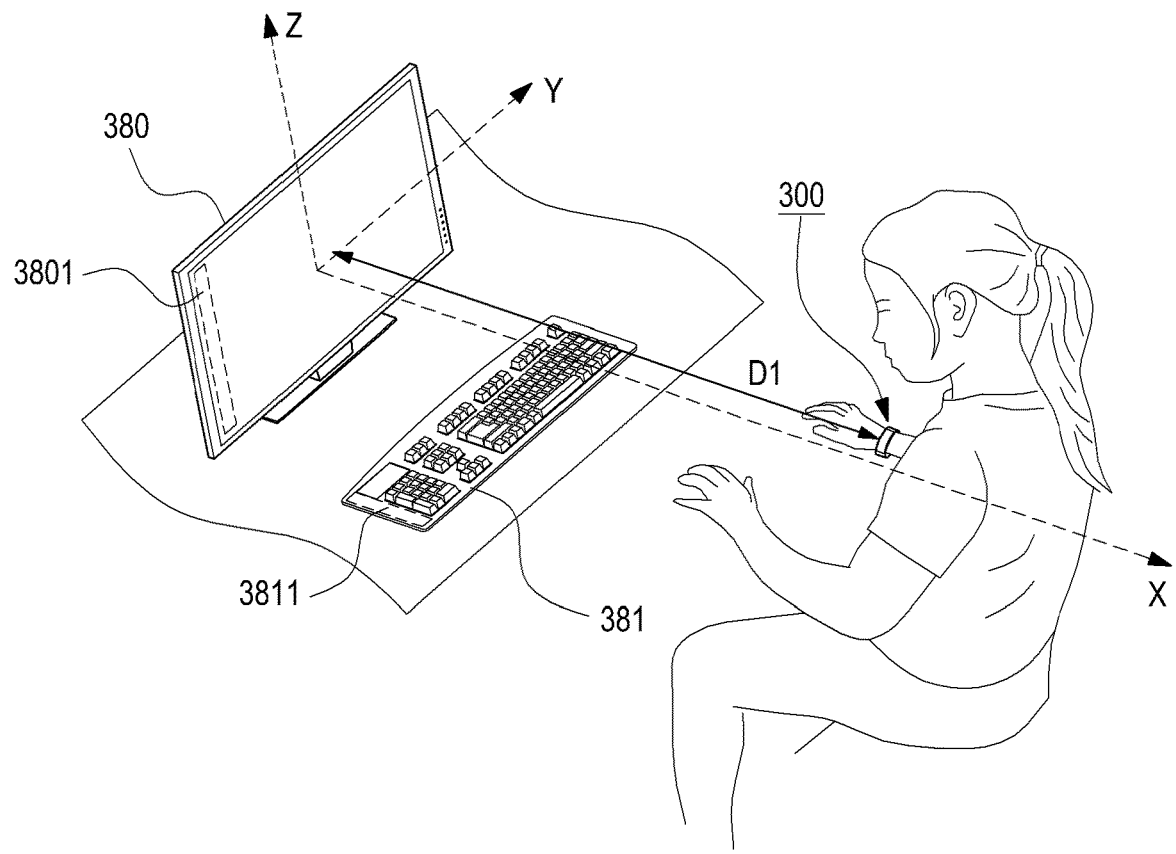
FIG. 23 is a perspective view illustrating an in-use state of the wearable device including the wireless charging device illustrated in FIG. 19.

As illustrated in FIGS. 22 and 23, when a user uses the wearable device 300 of the present disclosure in front of a computer and a keyboard, a first transmission resonator 3801 and a second transmission resonator 3811 embedded in a monitor 380 of the computer or in the keyboard 381 transmit power. In this case, the user wears the wearable device 300 on his/her wrist, and the wireless charging device of the wearable device 300 receives the power of the first transmission resonator 3801 and the second transmission resonator 3811. That is, the dummy resonator 330 of the wireless charging device receives the power of the first transmission resonator 3801 and the second transmission resonator 3811, and forwards the received power to the reception resonator 340 embedded in the housing 310, the reception resonator 340 converts the transferred power into DC power through the rectifier 351 of the wireless power reception module 350 to output the DC power, and the wireless power reception module 350 supplies the output DC power to the battery pack R1 to charge the battery pack.

The user may carry out various tasks in front of the computer and the keyboard, and at this time, the wireless charging device of the wearable device 300 worn on the user's wrist may charge the battery pack. That is, the user can charge the battery pack of the wearable device without having to separate the wearable device 300 from his/her wrist or body, thereby further enhancing wireless charging of the wearable device 300.

Figure 25:
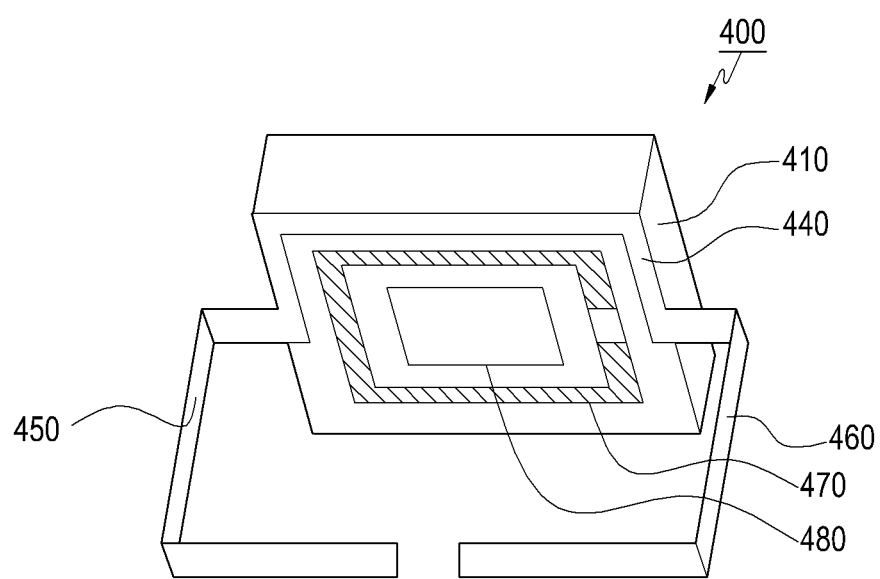
FIG. 25 is a perspective view illustrating a configuration of a wearable device including a wireless charging device according to yet another embodiment of the present disclosure.

FIG. 25 is a perspective view illustrating a configuration of a wearable device 400 including a wireless charging device according an embodiment ('an eighteenth embodiment) of the present disclosure.

Referring to FIG. 25, the wearable device 400 including the wireless charging device includes a housing 410 of the wearable device 400, a first strap 420 and a second strap 430, a first dummy resonator 440, a second dummy resonator 450, and a third dummy resonator 460, a reception resonator 470, and a wireless power reception module 480.

The wireless charging device may be constituted with the a first dummy resonator 440, the second dummy resonator 450, and the third dummy resonator 460, the reception resonator 470, and the wireless power reception module 480.

The first dummy resonator 440 is mounted in the housing 410 to be isolated from the reception resonator 470 and at the same time, to be disposed adjacent to the reception resonator 470.

The second dummy resonator 450 is mounted in the first strap 420 to be electrically connected to the first dummy resonator 440, and the third dummy resonator 460 is mounted in the second strap 430 to be electrically connected to the first dummy resonator 440.

The first dummy resonator 440, the reception resonator 470, and the wireless power reception module 480 may be mounted together in the housing 410.

The first strap 420 and the second strap 430 are connected to opposite sides of the housing 410 to surround a user's body and wrist.

The reception resonator 470 is provided in the housing 410 to receive power transmitted from an external wireless charging device.

The wireless power reception module 480 is provided in the housing 410 and is electrically connected to the reception resonator 470.

For example, the first dummy resonator 440 and the reception resonator 470 are mounted in the housing 410, and the second dummy resonator 450 and the third dummy resonator 460 are mounted in the first strap 420 and the second strap 430, respectively. At the same time, the first dummy resonator 440, the second dummy resonator 450, and the third dummy resonator 460, and the reception resonator 470 are physically isolated from each other. Although the first dummy resonator 440, the second dummy resonator 450, and the third dummy resonator 460, and the reception resonator 470 are physically separated from each other, the resonators have a high combination coefficient due to a small distance therebetween. Accordingly, the first dummy resonator 440, the second dummy resonator 450, and the third dummy resonator 460 may forward, to the reception resonator 470, power transmitted from the outside. Furthermore, the reception resonator 470 may independently receive the power transmitted from the outside.

For example, as illustrated in FIG. 25, the first dummy resonator 440, the second dummy resonator 450, and the third dummy resonator 460 receive the power transmitted from the outside and forward the received power to the reception resonator 470, and the wireless power reception module 480 rectifies AC power induced via the reception resonator 470 to DC power through the rectifier 351 (illustrated in FIG. 22) to output the DC power, and supplies the output DC power to a battery pack (not illustrated) included in the wearable device 400 to charge the battery pack.

Figure 27:
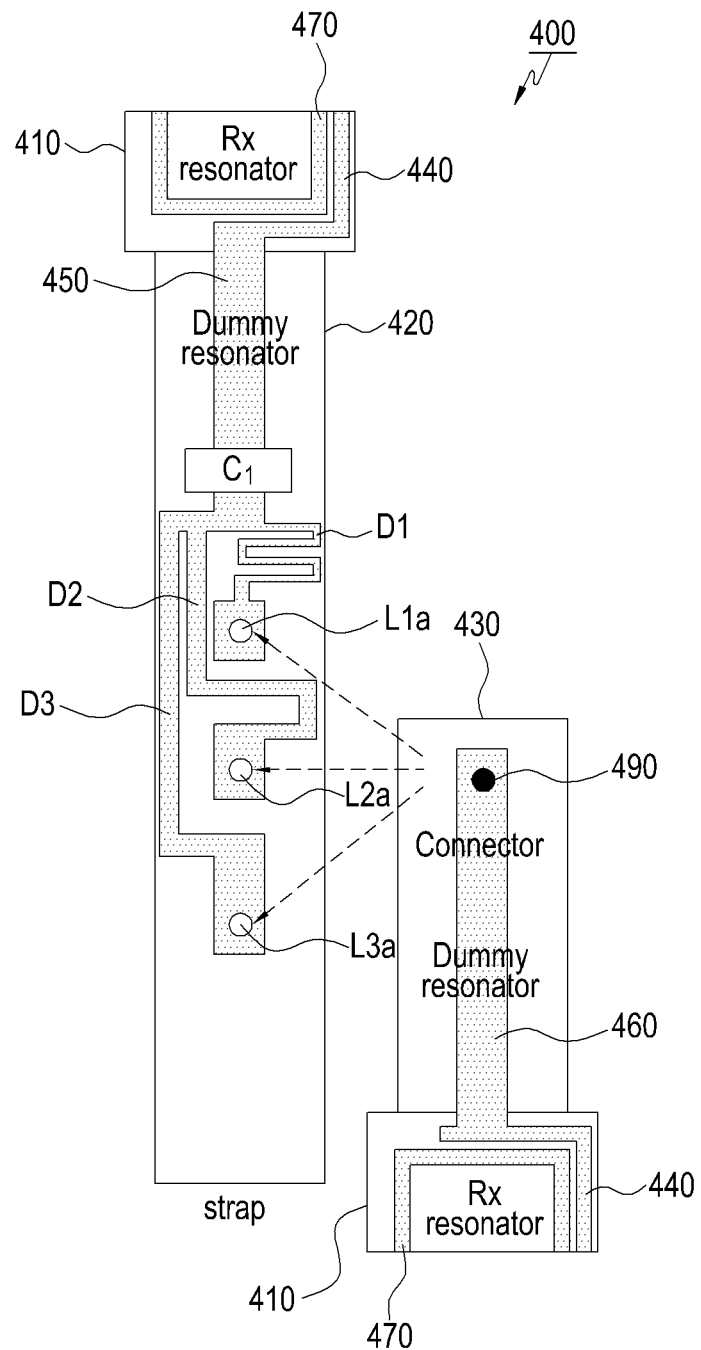
FIG. 27 illustrates an inductor of the wearable device including the wireless charging device illustrated in FIG. 25.
Figure 28:
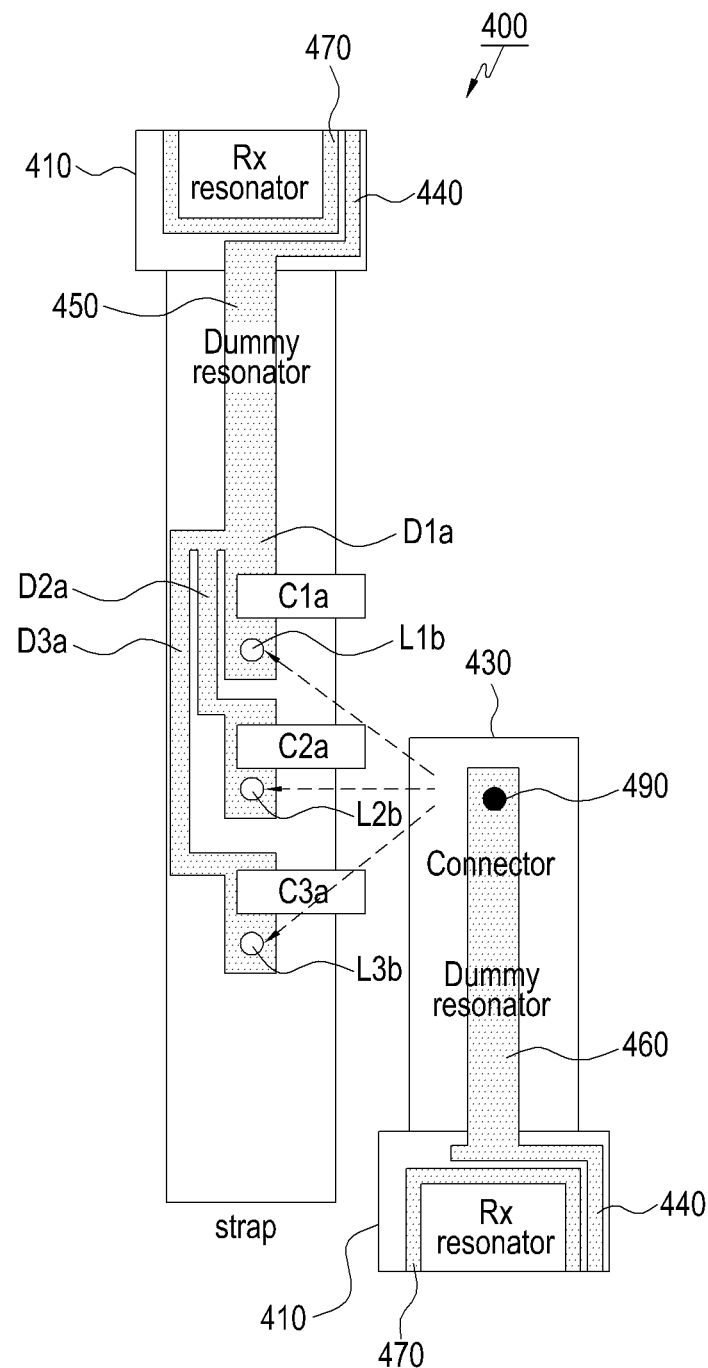
FIG. 28 illustrates an inductor of the wearable device including the wireless charging device illustrated in FIG. 25, according to another embodiment of the present disclosure.

FIG. 27 illustrates an inductor of the wearable device 400 including the wireless charging device, according to an embodiment of the present disclosure, and FIG. 28 illustrates an inductor of the wearable device 400 including the wireless charging device, according to another embodiment of the present disclosure.

As illustrated in FIG. 27, the second dummy resonator 450 may be provided with at least one inductor that is provided according to a fastening location of the first strap 420 and the second strap 430 and equivalently maintains resonant frequencies of the first dummy resonator 440, the second dummy resonator 450, and the third dummy resonator 460 that vary depending on the fastening location. In some embodiments, the fastening location may be variable.

For example, the second dummy resonator 450 may be provided with a first inductor $L1a$, a second inductor $L2a$, and a third inductor L3a, and at least one capacitor C1, and the third dummy resonator 460 is provided with a connector 490 that are electrically connected to the first inductor L1a, the second inductor L2a, and the third inductor L3a, when the first strap 420 and the second strap 430 are fastened to each other.

A first dummy line D1 may be provided between the first inductor L1a and the second dummy resonator 450 to establish an electrical connection therebetween. The first dummy line D1 may be formed to be bent several times in order to equivalently maintain a change in the inductance of the first inductor L1a.

Furthermore, a second dummy line D2 may be provided between the second inductor L2a and the second dummy resonator 450 to establish an electrical connection therebetween. The second dummy line D2 is located farther away from the second dummy resonator 450 than the first inductor L1a and is bent fewer times than the first dummy line D1 in order to equivalently maintain a change in the inductance of the second inductor L2a.

In addition, a third dummy line D3 may be provided between the third inductor L3a and the second dummy resonator 450 to establish an electrical connection therebetween. The third dummy line D3 is located farther away from the second dummy resonator 450 than the second inductor L2a and is bent fewer times than the second dummy line D2 in order to equivalently maintain a change in the inductance of the third inductor L3a.

Accordingly, the resonant frequencies of the first dummy resonator 440, the second dummy resonator 450, and the third dummy resonator 460 may be equivalently maintained by the first dummy line D1, the second dummy D2, and the third dummy line D3 irrespective of the fastening location of the first strap 420 and the second strap 430. That is, the first dummy resonator 440, the second dummy resonator 450, and the third dummy resonator 460 may maintain the inductances of the first inductor L1a, the second inductor L2a, and the third inductor L3a according to the fastening location of the first strap 420 and the second strap 430.

FIG. 28 illustrates an inductor of the wearable device 400 including the wireless charging device, according to another embodiment of the present disclosure.

As illustrated in FIG. 28, the inductor may include a first inductor L1b, a second inductor L2b, and a third inductor L3b, and the first inductor L1b, the second inductor L2b, and the third inductor L3b may be provided in the second dummy resonator 450. A connector 490 is provided in the third dummy resonator 460 to be electrically connected to the first inductor L1b, the second inductor L2b, and the third inductor L3b when the first strap 420 and the second strap 430 are fastened to each other.

A first dummy line D1a, a second dummy line D2a, and a third dummy line D3a may be provided between the second dummy resonator 450 and the first inductor L1b, the second inductor L2b, and the third inductor L3b, respectively, to establish an electrical connection therebetween.

The first dummy line D1a, the second dummy line D2a, and the third dummy line D3a may be provided with a first capacitor C1a, a second capacitor C2a, and a third capacitor C3a, respectively, which are set to have different capacitances according to a change in the inductances of the first inductor L1b, the second inductor L2b, and the third inductor L3b in order to equivalently maintain the resonant frequencies of the first dummy resonator 440, the second dummy resonator 450, and the third dummy resonator 460.

In other words, the first capacitor C1a, the second capacitor C2a, and the third capacitor C3 are provided at the first dummy line D1a, the second dummy line D2a, and the third dummy line D3a, respectively, to have capacitances set in advance according to the locations of the first inductor L1b, the second inductor L2b, and the third inductor L3b.

For example, when the first strap 420 and the second strap 430 are fastened to each other, the connector 490 of the third dummy resonator 460 is electrically connected to the first inductor L1b and at the same time, is electrically connected to the preset first capacitor C1a according to a change in the inductance of the first inductor L1b. In this case, the resonant frequencies of the first dummy resonator 440, the second dummy resonator 450, and the third dummy resonator 460 are maintained to be equivalent.

Furthermore, when the first strap 420 and the second strap 430 are fastened to each other, the connector 490 of the third dummy resonator 460 is electrically connected to the second inductor L2b, which is at a different location from the first inductor on the second dummy resonator 450, and at the same time, is electrically connected to the preset second capacitor C2a according to a change in the inductance of the second inductor L2b. In this case, the resonant frequencies of the first dummy resonator 440, the second dummy resonator 450, and the third dummy resonator 460 are maintained to be equivalent in the same way.

In addition, when the first strap 420 and the second strap 430 are fastened to each other, the connector 490 of the third dummy resonator 460 is electrically connected to the third inductor L3b, which is at a different location from the first and second inductors on the second dummy resonator 450, and at the same time, is electrically connected to the preset third capacitor C3a according to a change in the inductance of the third inductor L3b. In this case, the resonant frequencies of the first dummy resonator 440, the second dummy resonator 450, and the third dummy resonator 460 are maintained to be equivalent in the same way.

Accordingly, in cases where the inductances of the first inductor L1b, the second inductor L2b, and the third inductor L3b vary with the locations thereof when the first strap 420 and the second strap 430 are fastened to each other, the resonant frequencies of the first dummy resonator 440, the second dummy resonator 450, and the third dummy resonator 460 are equivalently maintained by the capacitances of the first capacitor C1a, the second capacitor C2a, and the third capacitor C3 that are differently set according to the locations.

Figure 26:
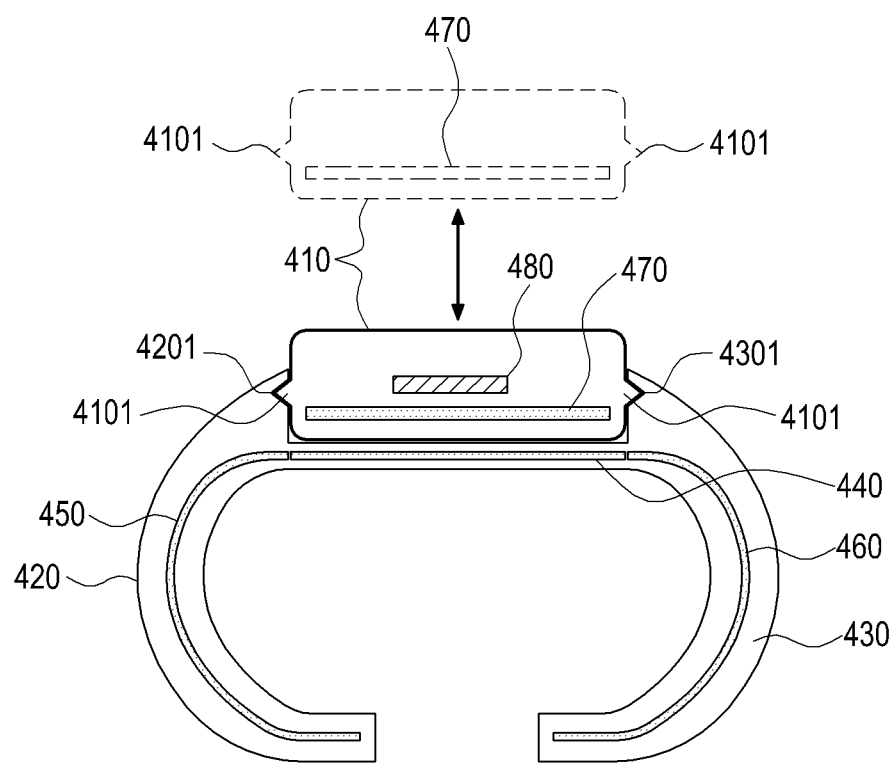
FIG. 26 is a perspective view illustrating attachment/detachment parts of the wearable device including the wireless charging device illustrated in FIG. 25.

As illustrated in FIG. 26, the housing 410 includes attachment/detachment parts 4101 that are attached to and detached from a first recess 4201 and a second recess 4301 formed in the separated first strap 420 and the second strap 430, respectively.

The attachment/detachment parts 4101 are formed of attachment/detachment bosses, and when the housing 410 and the first strap 420 and the second strap 430 are coupled to each other through the attachment/detachment parts 4101, the first dummy resonator 440, the second dummy resonator 450, and the third dummy resonator 460, and the reception resonator 470 are isolated from each other.

For example, the attachment/detachment bosses of the housing 410 are inserted and press-fitted into the first recess 4201 and the second recess 4301 of the first strap 420 and the second strap 430, and the reception resonator 470 provided in the housing 410 and the first dummy resonator 440, the second dummy resonator 450, and the third dummy resonator 460 provided in the first strap 420 and the second strap 430 are isolated from each other. In this case, the first dummy resonator 440, the second dummy resonator 450, and the third dummy resonator 460 receive power transmitted from the outside and forward the received power to the reception resonator 470.

When the housing 410 and the first strap 420 and the second strap 430 are separated from each other, the attachment/detachment parts 4101 of the housing 410 are separated and detached from the first recess 4201 and the second recess 4301 of the first strap 420 and the second strap 430. In this case, the reception resonator 470 provided in the housing 410 independently receives power transmitted from the outside to charge a battery pack provided in the housing.

Figure 29:
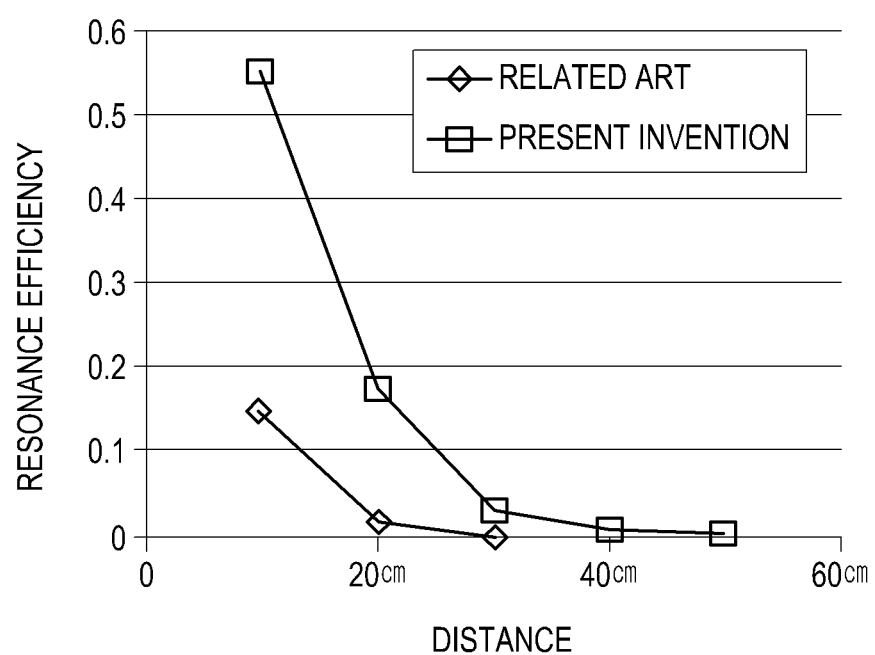
FIG. 29 is a graph depicting resonance efficiency of a wearable device including a wireless charging device according to yet another embodiment of the present disclosure.

FIG. 29 is a graph depicting resonance efficiency of a wearable device including a wireless charging device according to yet another embodiment of the present disclosure.

The graph of FIG. 29 shows that when the transmission distance of an external transmission resonator is 10 cm, a wireless charging device having no dummy resonator has resonance efficiency of 15%, whereas the wireless charging device of the present disclosure that includes a dummy resonator has improved resonance efficiency of 55%. Accordingly, as seen from the aforementioned graph, the resonance efficiency of the wireless charging device of the present disclosure is more than three times higher than that of the wireless charging device having no dummy resonator.

It will be obvious to those skilled in the art to which the present disclosure pertains that the above-described wearable devices including a wireless charging device, according to the various embodiments of the present disclosure, are not limited by the aforementioned embodiments and the accompanying drawings, and various substitutions, modifications and changes can be made within the spirit and scope of the present disclosure.

What is claimed is:

1. A wearable device including a wireless charging device, the wearable device comprising
   a housing;
   a first strap having a distal end and one end being connected to one side of the housing;
   a second strap having a distal end and another end connected to another side of the housing;
   a first buckle provided at the distal end of the first strap;
   a second buckle provided at the distal end of the second strap;
   a reception resonator provided in the housing to receive an AC power transmitted from an external device;
   a wireless power reception circuit provided in the housing, and configured to be electrically connected to the reception resonator; and
   a dummy resonator extended adjacently along more than one side of the reception resonator in the housing, physically separated from the reception resonator by a gap, and configured to be electrically coupled with the reception resonator, to forward the AC power transmitted from the external device to the reception resonator.

2. The wearable device of claim 1, further comprising:
   second reception resonators mounted in the first strap and the second strap, respectively; and
   a connector provided in the housing to electrically interconnect the wireless power reception circuit and the reception resonator,
   wherein one of the second reception resonators is mounted in the first strap and is electrically connected to the wireless power reception circuit, and
   at least one of the second reception resonators mounted in the second strap is mounted to be independently separated from the one of the second reception resonators of the first strap and the wireless power reception circuit.

3. The wearable device of claim 1, further comprising:
   second reception resonators mounted in the first strap and the second strap, respectively;
   a first connector provided in the housing to electrically interconnect the reception resonator and the wireless power reception circuit; and
   a second connector provided in the housing to electrically interconnect the reception resonator and one of the second reception resonators that is mounted in the first strap,
   wherein at least one of the second reception resonators mounted in the second strap is mounted to be independently separated from the reception resonator of the housing, the one of the second reception resonators of the first strap, and the wireless power reception circuit.

4. The wearable device of claim 1, further comprising:
   a connector provided in the housing to electrically interconnect the reception resonator and the wireless power reception circuit.

5. The wearable device of claim 1, wherein each of the first strap and the second strap comprises a flexible strap.

6. The wearable device of claim 1, wherein the wireless power reception circuit comprises a rectifier configured to rectify the AC power induced via the reception resonator, to output a DC power and supply the DC power to a battery pack included in the wearable device to thereby charge the battery pack.

7. The wearable device of claim 1, wherein the housing is detachably attached to the first strap and the second strap.

8. The wearable device of claim 1, wherein the distal end of the first strap and the distal end of the second strap comprise recesses, respectively, and
   the one side and the another end of the housing are configured to be coupled with the recesses, respectively, to connect the housing to the first strap and the second strap.

9. The wearable device of claim 1, wherein the first buckle and the second buckle are both configured to be operably connected when the wearable device is worn.

10. The wearable device of claim 1, wherein the reception resonator is nested inside the dummy resonator.

11. The wearable device of claim 1, further comprising a second dummy resonator provided in the first strap, and
    a third dummy resonator provided in the second strap.

12. The wearable device of claim 11, wherein the dummy resonator, the second dummy resonator, and the third dummy resonator are configured to receive the AC power transmitted from the external device and forward the AC power to the reception resonator.

13. The wearable device of claim 1, wherein the reception resonator has a first portion and a second portion connected to opposing ends of the first portion,
    the dummy resonator partially surrounds the reception resonator by extending along the first portion of the side of the reception resonator such that the dummy resonator and the reception resonator overlap in the first portion, and
    the dummy resonator does not extend along the second portion so that the dummy resonator and the reception resonator do not overlap in the second portion.

* * * * *